United States Patent
Yoder

(10) Patent No.: US 11,286,669 B2
(45) Date of Patent: Mar. 29, 2022

(54) SHINGLE CUTTING MACHINE

(71) Applicant: Quail Manufacturing, LLC, Partridge, KS (US)

(72) Inventor: David M. Yoder, Partridge, KS (US)

(73) Assignee: Quail Manufacturing, LLC, Partridge, KS (US)

( * ) Notice: Subject to any disclaimer, the term of this patent is extended or adjusted under 35 U.S.C. 154(b) by 0 days.

(21) Appl. No.: 16/356,634

(22) Filed: Mar. 18, 2019

(65) Prior Publication Data

US 2019/0284808 A1    Sep. 19, 2019

Related U.S. Application Data

(60) Provisional application No. 62/644,868, filed on Mar. 19, 2018.

(51) Int. Cl.
*E04D 1/26* (2006.01)
*B27M 3/02* (2006.01)
*E04D 1/00* (2006.01)

(52) U.S. Cl.
CPC ............... *E04D 1/26* (2013.01); *B27M 3/02* (2013.01); *B32B 2419/06* (2013.01); *E04D 2001/005* (2013.01)

(58) Field of Classification Search
CPC .. E04D 15/02; E04D 1/26; E04D 1/20; E04D 2001/005; B32B 419/06; B27M 3/02; G06Q 30/04; B23D 45/143; B26D 3/10; B26D 1/30; B26D 7/016; Y10T 83/222; Y10T 83/8785; Y10T 83/9428; Y10T 156/1326; Y10T 83/8809; Y10T 83/762; Y10T 83/8812; Y10T 83/7647; Y10T 83/8814; Y10T 83/8779; Y10T 83/8773

USPC ..... 83/13, 472, 473, 197, 467.1, 167, 409.1, 83/618, 874, 409, 588, 468.3, 468.7, 581, 83/584, 605, 608, 614

See application file for complete search history.

(56) References Cited

U.S. PATENT DOCUMENTS

| | | | | |
|---|---|---|---|---|
| 2,455,579 A | * | 12/1948 | Hensel | A01J 25/16 83/619 |
| 3,257,884 A | * | 6/1966 | Best | G01N 1/286 83/132 |
| 3,605,839 A | * | 9/1971 | Gerson | B26D 7/0608 83/425.3 |
| 3,605,840 A | * | 9/1971 | Morrett | B26D 3/26 83/425.3 |

(Continued)

*Primary Examiner* — Ghassem Alie
(74) *Attorney, Agent, or Firm* — Sand, Sebolt & Wernow., LPA

(57) ABSTRACT

A shingle cutting machine having a frame having an upper frame assembly and a lower frame assembly is disclosed. The upper frame assembly is pivotable relative to the lower frame assembly between a shingle loading position and a shingle cutting position. The shingle cutting machine has a receiving area defined in the lower frame assembly for receiving a shingle therein. An upper blade assembly is provided on the upper frame assembly and a lower blade assembly is provided on the lower frame assembly. The upper and lower blade assemblies are operable in the receiving area to cut a shingle in the receiving area. A collection area defined vertically below the receiving area does not extend outwardly beyond a perimeter of the lower frame assembly. Shingle tabs cut from the shingle drop directly from the receiving area and into the collection area.

13 Claims, 32 Drawing Sheets

(56) References Cited

U.S. PATENT DOCUMENTS

| | | | | | |
|---|---|---|---|---|---|
| 3,899,947 | A | * | 8/1975 | Faltin | B26D 7/1836 83/113 |
| 4,499,805 | A | * | 2/1985 | Mori | B26F 1/36 83/468 |
| 4,527,455 | A | * | 7/1985 | Morax | B43M 7/008 83/588 |
| 5,531,146 | A | * | 7/1996 | Pederson | B26D 1/30 193/35 TE |
| 6,595,093 | B1 | * | 7/2003 | Artigas | B26D 1/30 83/468.3 |
| 2003/0037652 | A1 | * | 2/2003 | Tsai | B26D 3/10 83/167 |
| 2011/0137779 | A1 | * | 6/2011 | Gendron | G06Q 30/04 705/34 |
| 2015/0345200 | A1 | * | 12/2015 | Repac | E05F 1/1215 241/84.3 |
| 2016/0158956 | A1 | * | 6/2016 | Repac | A47J 43/25 241/95 |
| 2016/0302620 | A1 | * | 10/2016 | Repac | B26D 3/185 |

\* cited by examiner

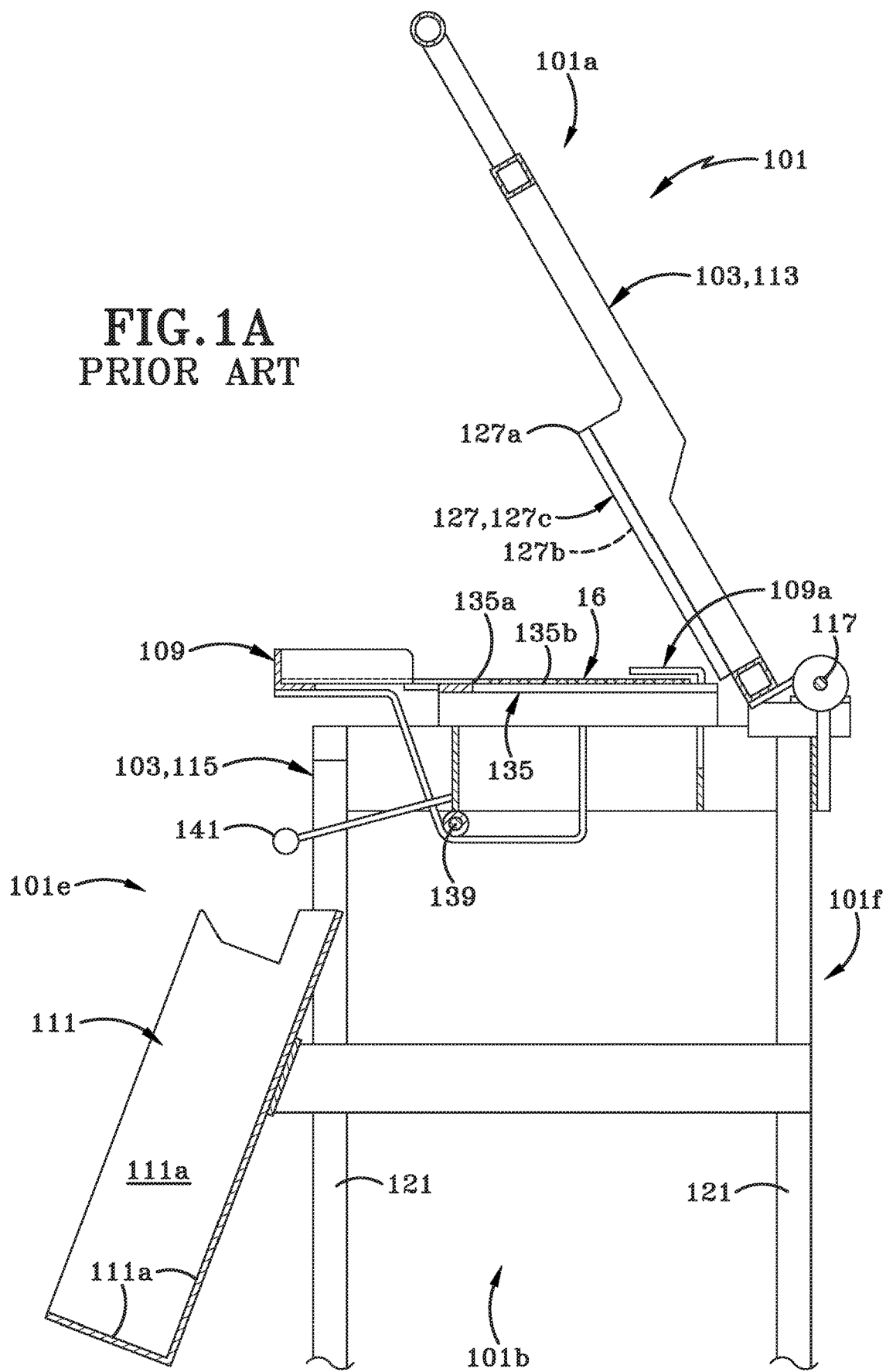

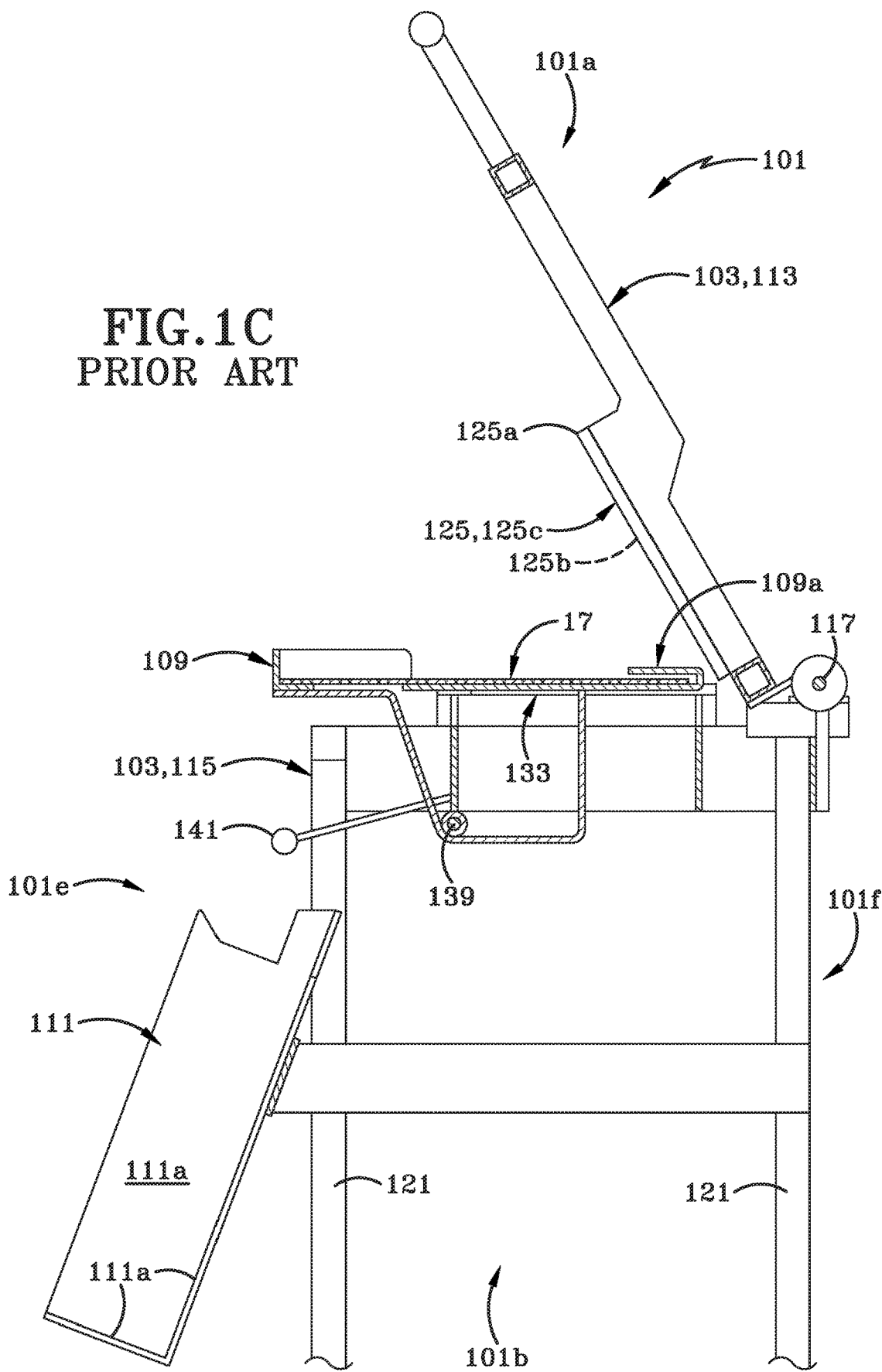

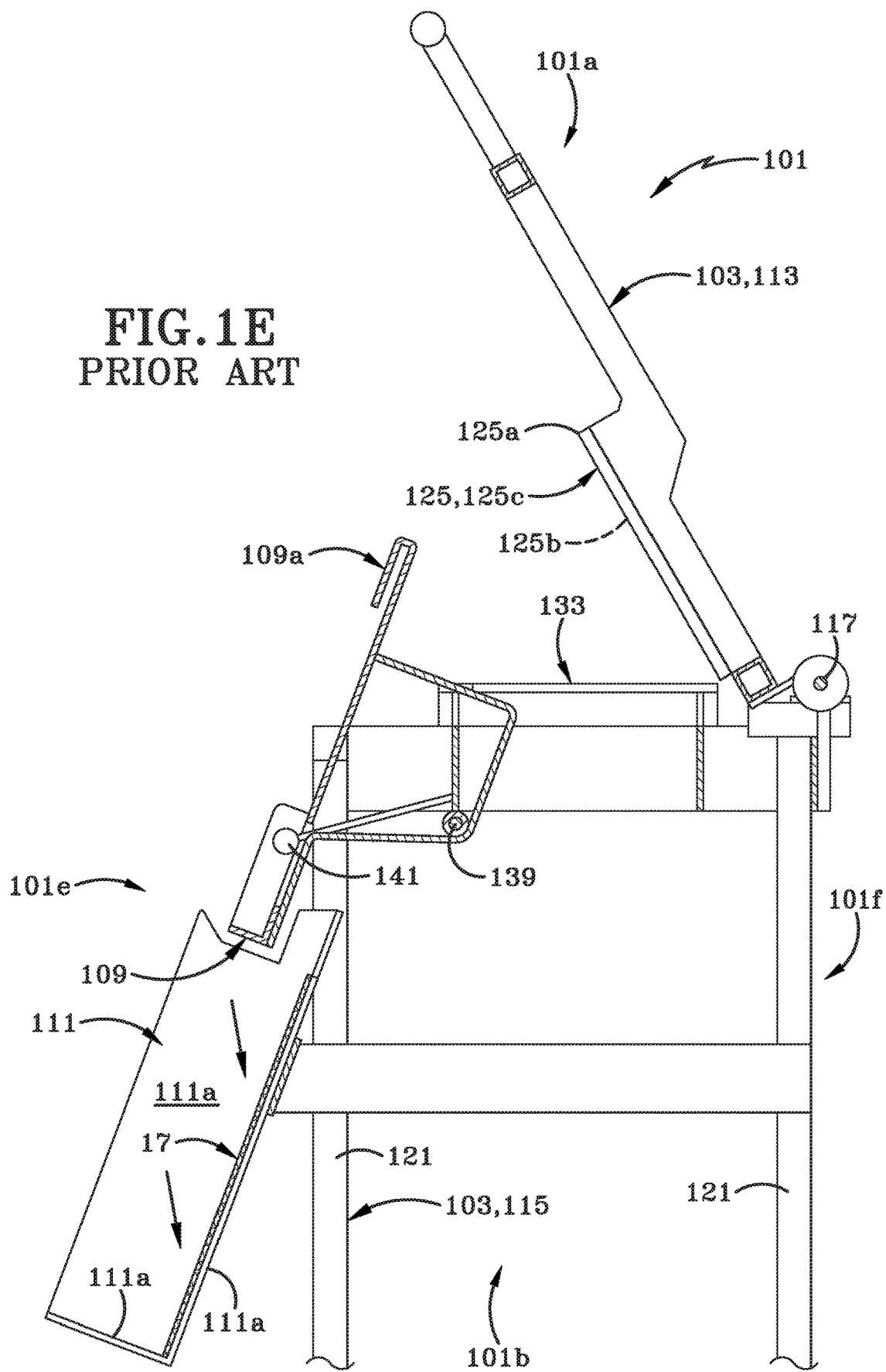

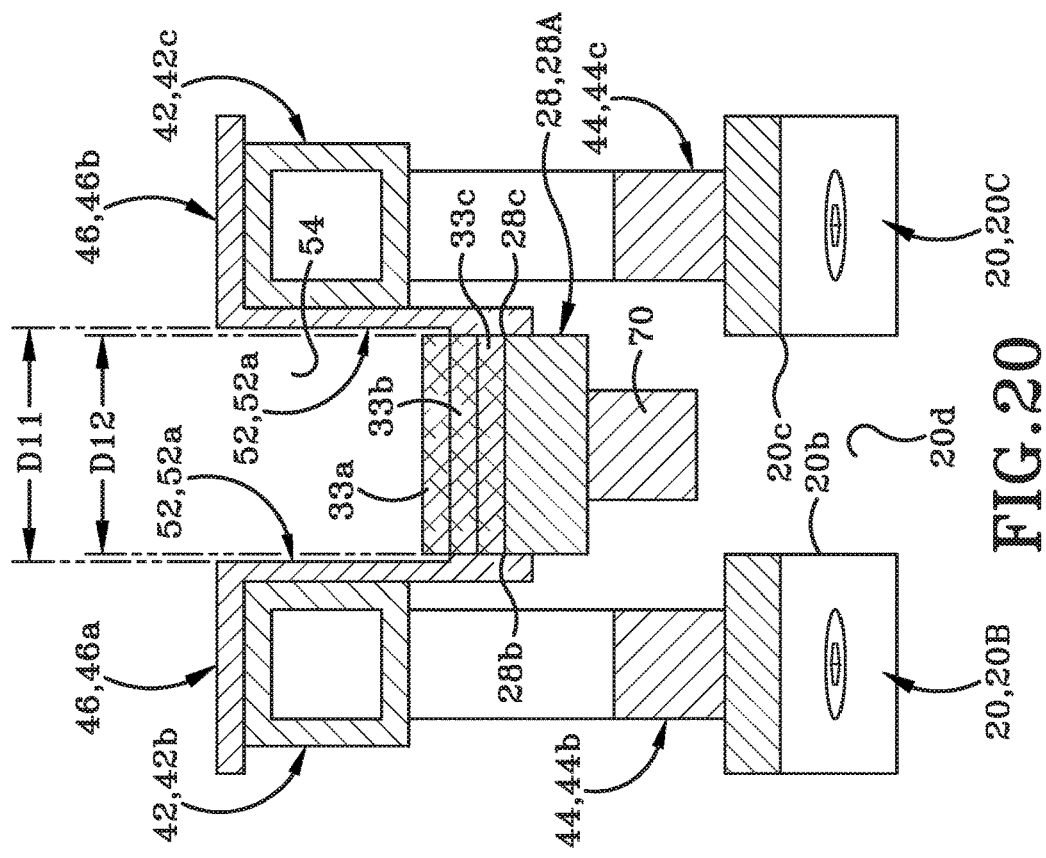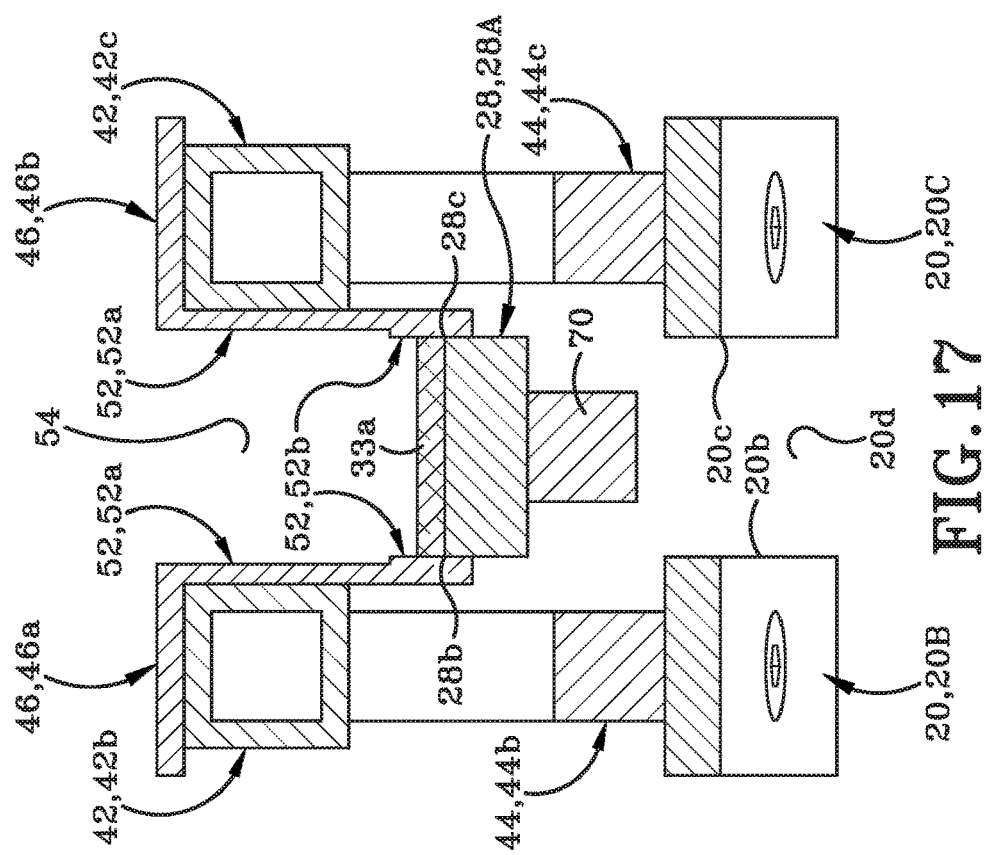

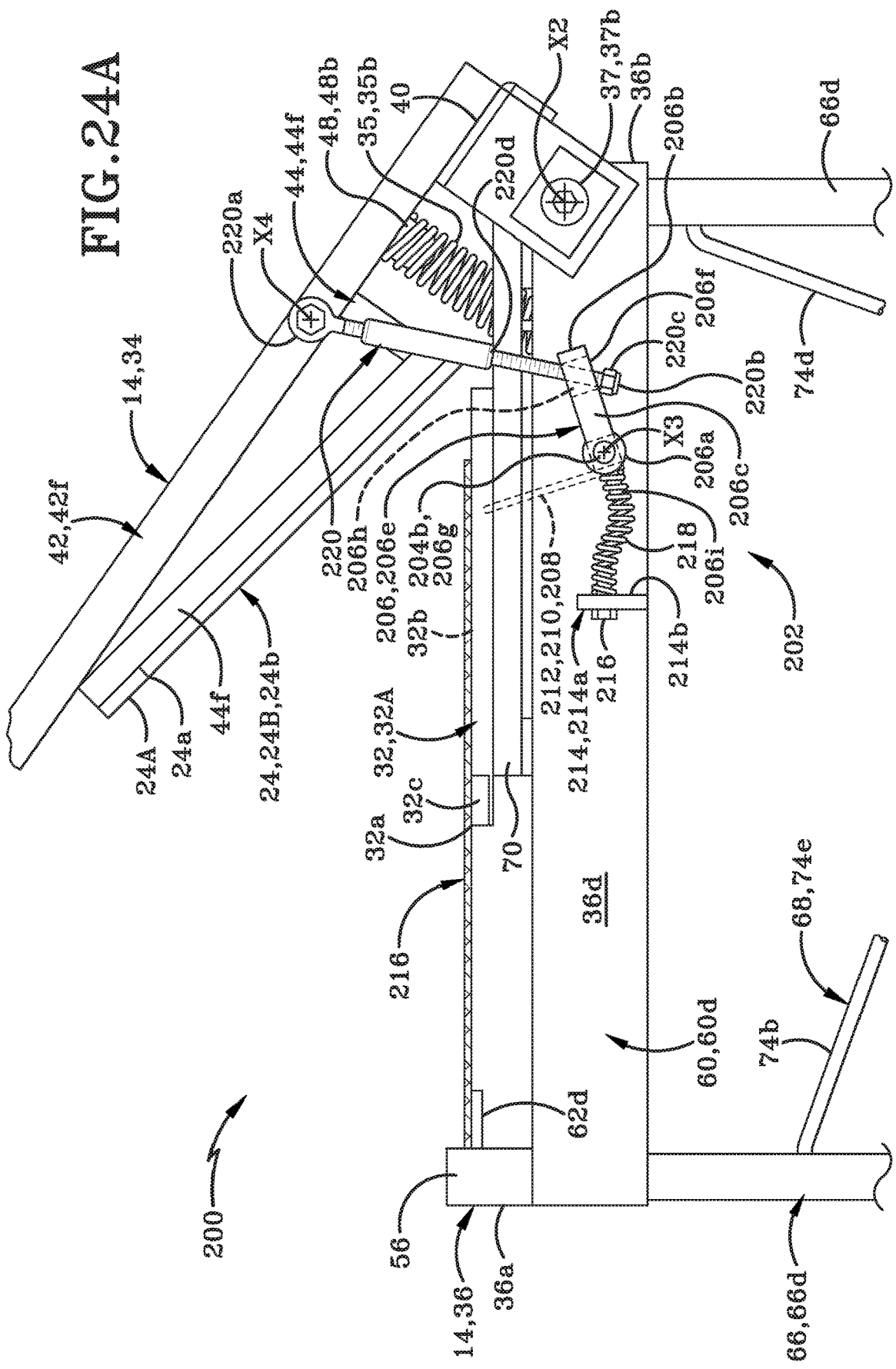

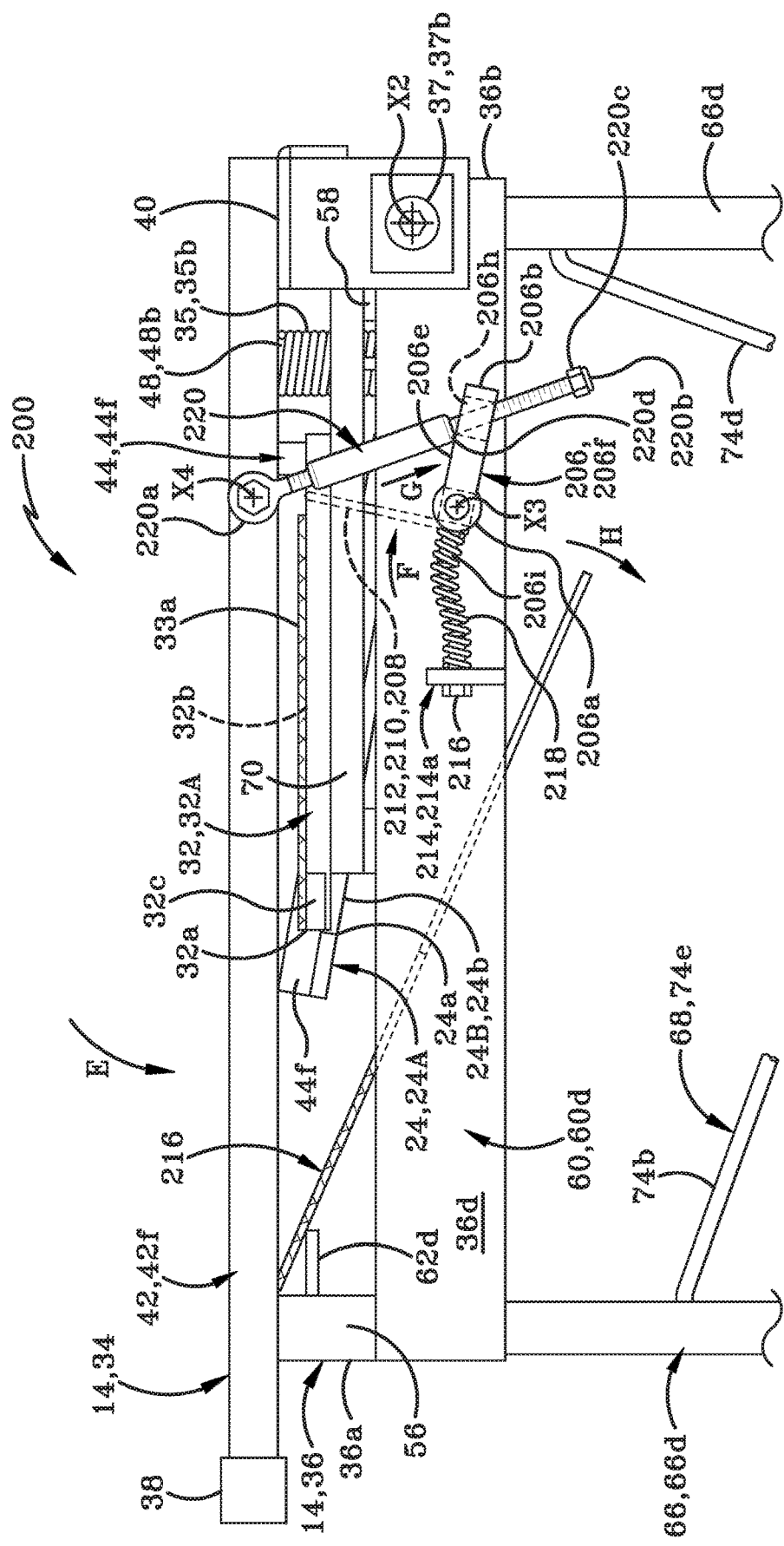

SHINGLE CUTTING MACHINE

REFERENCE TO RELATED APPLICATIONS

This application claims the benefit of U.S. Provisional Application Ser. No. 62/644,868, filed on Mar. 19, 2018; the disclosure of which is incorporated herein by reference.

TECHNICAL FIELD

The present disclosure relates generally to the field of construction equipment. More particularly, the present disclosure relates to a machine for cutting shingles. Specifically, the present disclosure relates to a machine for cutting full size shingles into smaller shingle pieces, such as shingle tabs.

BACKGROUND INFORMATION

Shingles are building materials that are positioned on an object, such as a roof of a house or a roof of a barn, in an overlapping manner so as to cover the object and thereby protect the same from the elements. There are many types of shingles available and one exemplary type of shingle is an asphalt shingle that is referred to as a 3-Tab shingle. Some 3-Tab shingles include two spaced-apart slits that divide the 3-Tab shingle into three regions, each of which is approximately twelve inches wide. Each region may be referred to as a "tab." Other 3-Tab shingles do not include the slits but are provided, instead, with lines of perforations that demarcate the tabs.

3-Tab shingles may be installed on the roof of a house so that at least one tab of a first shingle overlaps at least one tab of an adjacent second shingle. 3-Tab shingles may not be suitable for covering certain areas of the roof, such as where two sloped regions of the roof intersect. In these regions of the roof, instead of using the 3-Tab shingles, individual shingle tabs or smaller shingle pieces typically have to be used. The installer will cut individual tabs or pieces off a 3-Tab shingle for this purpose. The individual tabs or pieces may be cut by hand but since this is a time-consuming laborious task when covering an entire roof with shingles, a shingle cutting machine may be utilized to cut the shingles.

SUMMARY

The present disclosure is directed to an improved shingle cutting machine useful for cutting 3-Tab shingles into individual tabs.

In one aspect, the present disclosure may provide a shingle cutting machine comprising a frame including an upper frame assembly and a lower frame assembly, wherein the upper frame assembly is pivotable relative to the lower frame assembly between a shingle loading position and a shingle cutting position; a receiving area defined in the lower frame assembly, said receiving area being adapted to receive a shingle therein; an upper blade assembly provided on the upper frame assembly; a lower blade assembly provided on the lower frame assembly; wherein the upper and lower blade assemblies are operable in the receiving area; and a collection area defined vertically below the receiving area, wherein the collection area is adapted to receive a shingle tab cut from a shingle. The collection area may include a retaining mechanism that extends downwardly from the receiving area. The lower frame assembly may have a perimeter and none of the collection area extends outwardly beyond the perimeter. The receiving area may remain in a fixed orientation relative to the lower frame assembly.

In one example, the upper blade assembly further comprises a first blade body having a first cutting edge and a second blade body having a second cutting edge; wherein the second cutting edge is orthogonal to the first cutting edge. The upper blade assembly may further include a third blade body having a third cutting edge; wherein the third cutting edge is parallel to the first cutting edge. The shingle cutting machine may further include an opening defined between the first cutting edge and the third cutting edge.

The lower blade assembly may pass at least partially through the opening in the upper blade assembly when the upper frame assembly is pivoted into the cutting position.

In one example, the lower blade assembly comprises a blade member having a first cutting edge and a second cutting edge; wherein the first cutting edge is orthogonal to the second cutting edge. The blade member may further include a tapered portion; and wherein the second cutting edge is provided on the tapered portion. The lower frame assembly may have a front edge and an opposed rear edge and a transverse center axis extending between the front edge and the rear edge; and wherein the tapered portion angles downwardly away from the center axis. The tapered portion may be provided a distance rearwardly from the front edge of the lower frame assembly. The lower blade assembly may include at least one lower blade that is angled downwardly and toward a side edge of the lower frame assembly.

The shingle cutting machine may further include a plate mounted between one of a front edge and a rear edge of the lower frame assembly and the lower blade assembly; and wherein the plate is adapted to be received in a slot defined in a shingle seated within the receiving area.

The shingle cutting machine may further include a support rod rotatably mounted between a first side and a second side of the lower frame assembly; at least one support plate fixedly engaged with the support rod and adapted to selectively support a portion of the shingle thereon; a lever mechanism engaged with the support rod, the lever mechanism being operable to rotate the support rod. The shingle cutting machine may further include a push-pull rod operably engaged with the lever mechanism and the upper frame assembly; and a spring operably engaged with the lever mechanism and the lower frame assembly, the spring biasing through a plurality of positions.

In one aspect, the present disclosure may provide a method of cutting a shingle comprising pivoting an upper frame assembly of a shingle cutting machine into a loading position; placing a shingle in a receiving area defined in a lower frame assembly of the shingle cutting machine; pivoting the upper frame assembly from the loading position to a cutting position; cutting the shingle; and dropping a shingle tab cut from the shingle into a collection area located vertically beneath the receiving area in the lower frame assembly.

The method may further include maintaining the receiving area in a fixed orientation relative to the lower frame assembly during the cutting and dropping steps. The method may further include shearing the shingle between an upper blade assembly provided on the upper frame assembly and a lower blade assembly provided on the lower frame assembly. The method may further include passing a portion of the lower blade assembly through an opening in the upper blade assembly.

In one aspect, the present disclosure may provide a shingle cutting machine including at least one blade assembly carried by a frame. In one example, the at least one blade assembly is configured to cut 3-Tab shingles forming portions of shingles, such as individual shingle tabs.

The at least one blade assembly includes a first upper blade assembly, a second upper blade assembly, a third upper blade assembly, a fourth upper blade assembly, a first lower blade assembly, a second lower blade assembly, a third lower blade assembly and a fourth lower blade assembly each carried by the frame.

In one example, the first upper blade assembly, the second upper blade assembly, the third upper blade assembly and the fourth upper blade assembly interacts with the first lower blade assembly, the second lower blade assembly, the third lower blade assembly and the fourth lower blade assembly to cut the 3-Tab shingles forming individual shingle tabs with notches. The individual shingle tabs fall through the shingle cutting machine and are retained by a retaining mechanism.

In another aspect, the present disclosure may provide a shingle cutting machine including at least one blade assembly carried by a frame. The at least one blade assembly is configured to cut 3-Tab shingles forming portions of shingles, such as individual shingle tabs. The at least one blade assembly includes a first upper blade assembly, a second upper blade assembly, a third upper blade assembly, a fourth upper blade assembly which interacts with a first lower blade assembly, a second lower blade assembly, a third lower blade assembly and a fourth lower blade assembly to cut the 3-Tab shingles forming individual shingle tabs with notches.

In another aspect, the present disclosure may provide a shingle cutting machine including a frame including an upper frame assembly and a lower frame assembly. The upper frame assembly is pivotable relative to the lower frame assembly between a shingle loading position and a shingle cutting position. The shingle cutting machine further includes a receiving area defined in the lower frame assembly, the receiving area being adapted to receive a shingle therein, an upper blade assembly provided on the upper frame assembly, a lower blade assembly provided on the lower frame assembly, wherein the upper and lower blade assemblies are operable in the receiving area, and a collection area defined vertically below the receiving area, wherein the collection area is adapted to receive a shingle tab cut from a shingle.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element is designed as multiple elements or that multiple elements is designed as one element. In some examples, an element shown as an internal component of another element is implemented as an external component and vice versa. Furthermore, elements may not be drawn to scale.

FIG. 1A is a cross-section view taken along line 1A-1A of FIG. 1 with a 3-Tab shingle positioned within the PRIOR ART shingle cutting machine;

FIG. 1C is a cross-section view taken along line 1C-1C of FIG. 1 with the 3-Tab shingle positioned within the PRIOR ART shingle cutting machine;

FIG. 1E is an operational view of FIG. 1C showing the individual shingle-tab being retained in a shingle retainer;

FIG. 17 is a cross-section view taken along line 17-17 of FIG. 16;

FIG. 20 is a cross-section view taken along 20-20 of FIG. 18;

FIG. 24A is a right elevation view of the shingle cutting machine of FIG. 22 with the perforated 3-Tab shingle placed within the shingle cutting machine;

FIG. 24C is an operational view of FIG. 24A showing the upper frame of the shingle cutting machine of FIG. 22 completely lowered;

Similar numbers refer to similar parts throughout the drawings.

DETAILED DESCRIPTION

Figure 1:
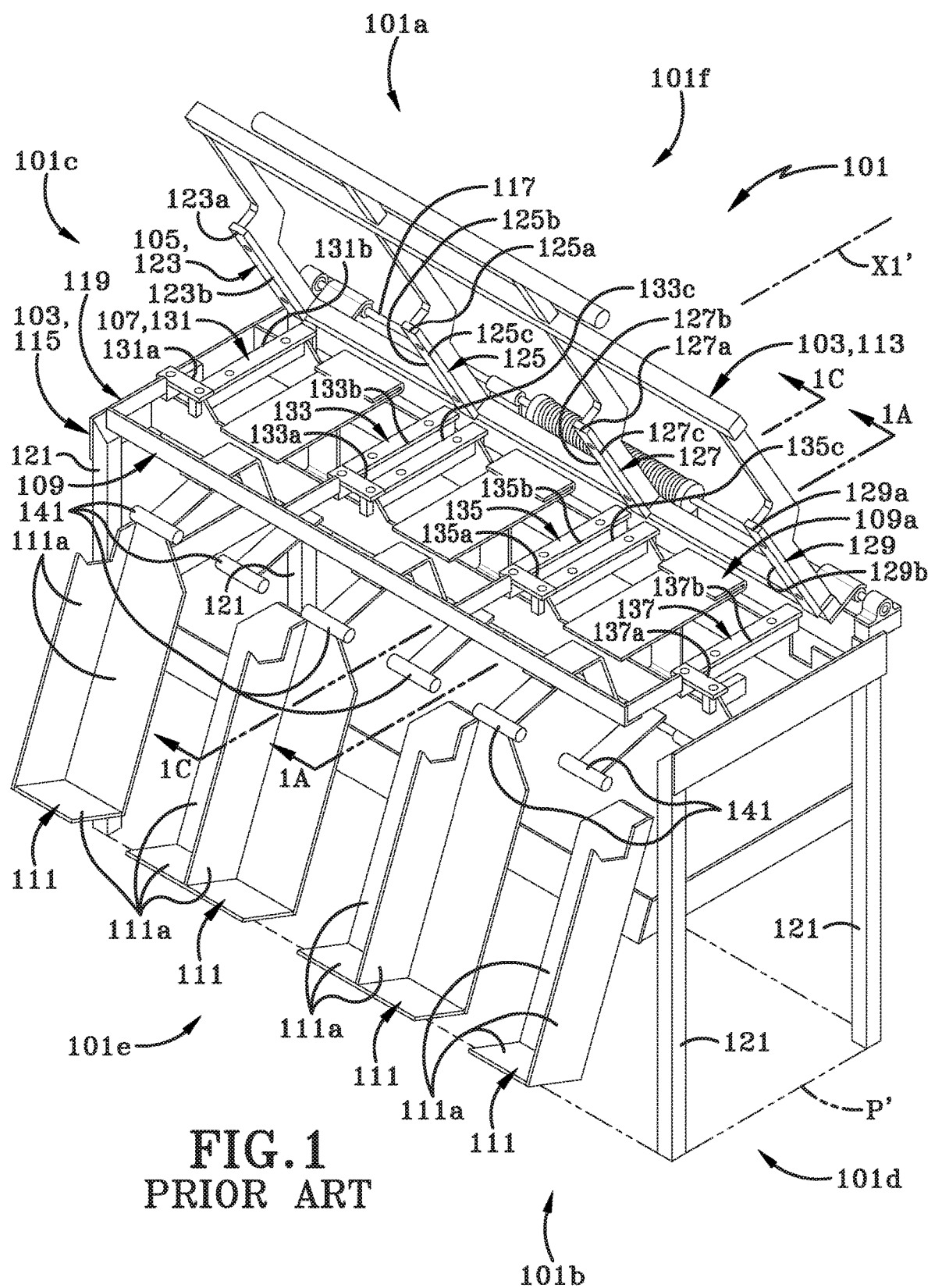
FIG. 1 is a front top right isometric perspective view of a PRIOR ART shingle cutting machine.
Figure 2:
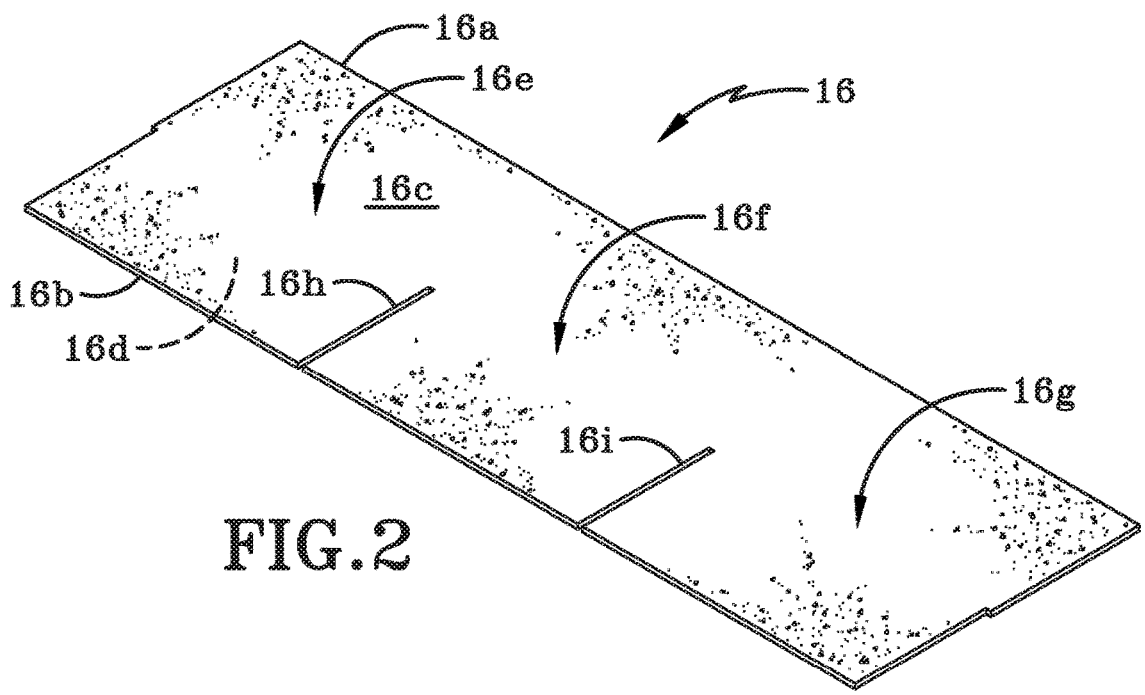
FIG. 2 is a front top right isometric perspective view of a 3-Tab shingle.
Figure 3:
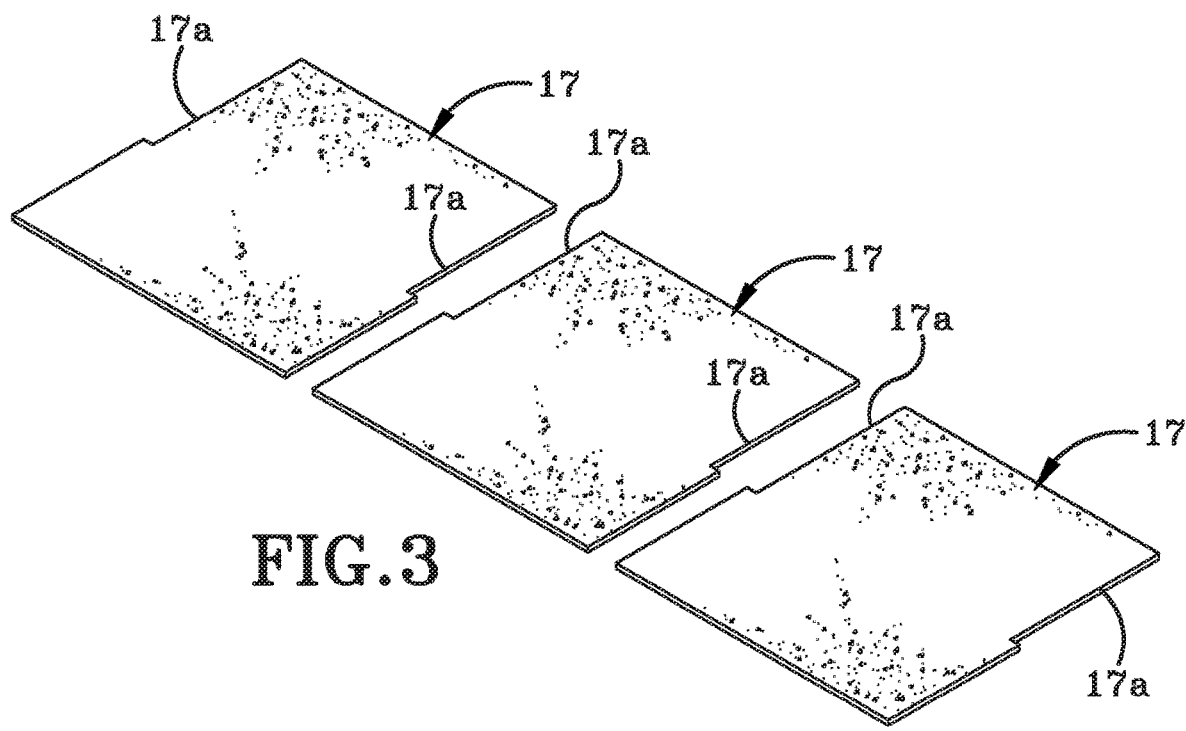
FIG. 3 is a front top right isometric perspective view of individual shingle tabs having notches cut from the 3-Tab shingle.

FIG. 1 through FIG. 1E illustrate a PRIOR ART shingle cutting machine 101 and FIG. 2 illustrates a typical 3-Tab shingle 16 which may be cut utilizing the PRIOR ART shingle cutting machine 101. 3-Tab shingle 16 includes a top edge 16a, a bottom edge 16b, a front surface 16c, a rear surface 16d and three tabs 16e, 16f and 16g separated by two slots 16h and 16i. The shingle cutting machine 191 may be used to cut the 3-Tab shingle 16 to form individual shingle tabs 17 (FIG. 3) as further described below.

The PRIOR ART shingle cutting machine 101 includes a top end 101a and a bottom end 101b defining a vertical direction therebetween, a first side 101c and a second side 101d defining a longitudinal direction therebetween and a front end 101e and a rear end 101f defining a transverse direction therebetween. The shingle cutting machine includes a transverse axis X1' extending transversely through the center of the PRIOR ART shingle cutting machine 101 and between front end 101e and rear end 101f. The PRIOR ART shingle cutting machine 101 further includes a frame 103 upon which are mounted a plurality of upper blade assemblies 105, a plurality of lower blade assemblies 107, a pivotable support and transfer mechanism 109, and three shingle retainers 111. Each of these components will be described in greater detail hereafter.

The frame 103 includes an upper frame 113 and a lower frame 115. The upper frame 113 is pivotally engaged with the lower frame 115 by way of a first pivot rod 117. Upper frame 113 is able to be pivoted relative to lower frame 115 between an open position and a closed position. The lower frame 115 carries the plurality of lower blades 107. The lower frame 115 resembles a table having a horizontal base region 119 supported on four legs 121 that the hold the base region 119 above the ground so that is at a comfortable height for an operator to use. The lower frame 115 further includes a perimeter P' (FIG. 1) bounded and defined by an outside portion of the four legs 121.

The plurality of upper blade assemblies 105 of the PRIOR ART shingle cutting machine 101 includes a first upper blade assembly 123, a second upper blade assembly 125, a third upper blade assembly 127, and a fourth upper blade assembly 129. The first, second, third, and fourth upper blade assemblies are spaced apart from each other and extend transversely between front end 101e and rear end 101f. The first upper blade assembly 123 is generally rectangular in shape and includes a first blade member having a longitudinally extending first cutting edge 123a and a transversely extending second cutting edge 123b. The second upper blade assembly 125 is generally rectangular in shape and includes a second blade member having a longitudinally extending first cutting edge 125a, a transversely extending second cutting edge 125b, and a transversely extending third cutting edge 125c. The third upper blade assembly 127 is generally rectangular in shape and includes a third blade member having a longitudinally extending first cutting edge 127a, a transversely extending second cutting edge 127b, and a transversely extending third cutting edge 127c. The fourth upper blade assembly 129 is generally rectangular in shape and includes a fourth blade member having a longitudinally extending first cutting edge 129a and a transversely extending second cutting edge 129b.

The plurality of lower blade assemblies includes of the PRIOR ART shingle cutting machine 101 a first lower blade assembly 131, a second lower blade assembly 133, a third lower blade assembly 135, and a fourth lower blade assembly 137. The first lower blade assembly 131 is generally L-shaped and includes a first blade body having a longitudinally extending first cutting edge 131a and a second blade body having a transversely extending second cutting edge 131b. The second lower blade assembly 133 is a generally elongated U-shaped member or open-ended rectangular member. The second lower blade assembly 133 includes a first blade body having a longitudinally extending first cutting edge 133a, a second blade body having a transversely extending second cutting edge 133b and a third blade body having a transversely extending third cutting edge 133c. The first cutting edge 133a, the second cutting edge 133b and the third cutting edge 133c bound and define a first opening 133d. The first opening 133d is sized to receive a portion of the 3-Tab shingle 16 after the 3-Tab shingle 16 is cut. The third lower blade assembly 135 is a generally elongated U-shaped member or open-ended rectangular member. The third lower blade assembly 135 includes a first blade body having a longitudinally extending first cutting edge 135a, a second blade body having a transversely extending second cutting edge 135b and a third blade body having a transversely extending third cutting edge 135c. The first cutting edge 135a, the second cutting edge 135b and the third cutting edge 135c defines a second opening 135d. The second opening 135d is sized to receive a portion of the 3-Tab shingle 16 after the 3-Tab shingle 16. The fourth lower blade assembly 137 is generally L-shaped and includes a first blade body having a longitudinally extending first cutting edge 137a and a second blade body having a transversely extending second cutting edge 137b.

The support and transfer mechanism 109 of the PRIOR ART shingle cutting machine 101 includes three shingle holders 109a and is configured to support the 3-Tab shingle 16 while the 3-Tab shingle 16 is being cut and to then transfer the individual shingle tabs 17 after the 3-Tab shingle is cut. The support and transfer mechanism 109 further includes a second pivot rod 139 (FIG. 1A) for pivoting the support and transfer mechanism 109 from a supporting position to a transferring position as further described below.

The three shingle retainers 111 are configured to receive the individual shingle tabs 17 after the 3-Tab shingle 16 is cut. The three shingle retainers each have a plurality of walls 111a (FIG. 1) configured to retain the individual shingle tabs 17. Each of the shingle retainers 111 extends outwardly away from the perimeter P' as shown in FIG. 1a.

Figure 1B:
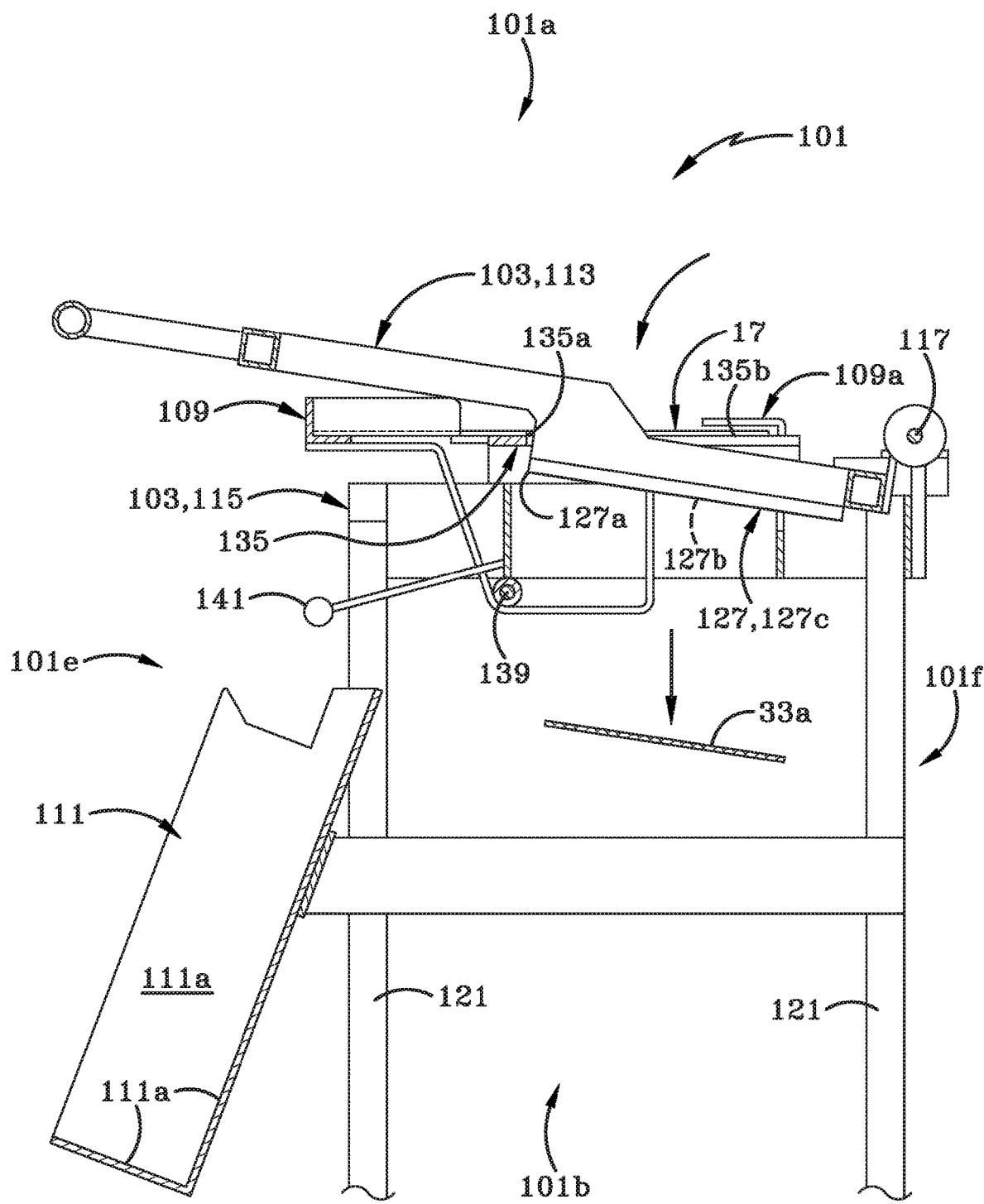
FIG. 1B is an operational view of FIG. 1A showing the upper frame being lowered to cut the 3-Tab shingle into individual shingle tabs with a portion of the 3-Tab shingle falling directly vertically below the shingle cutting machine.
Figure 1D:
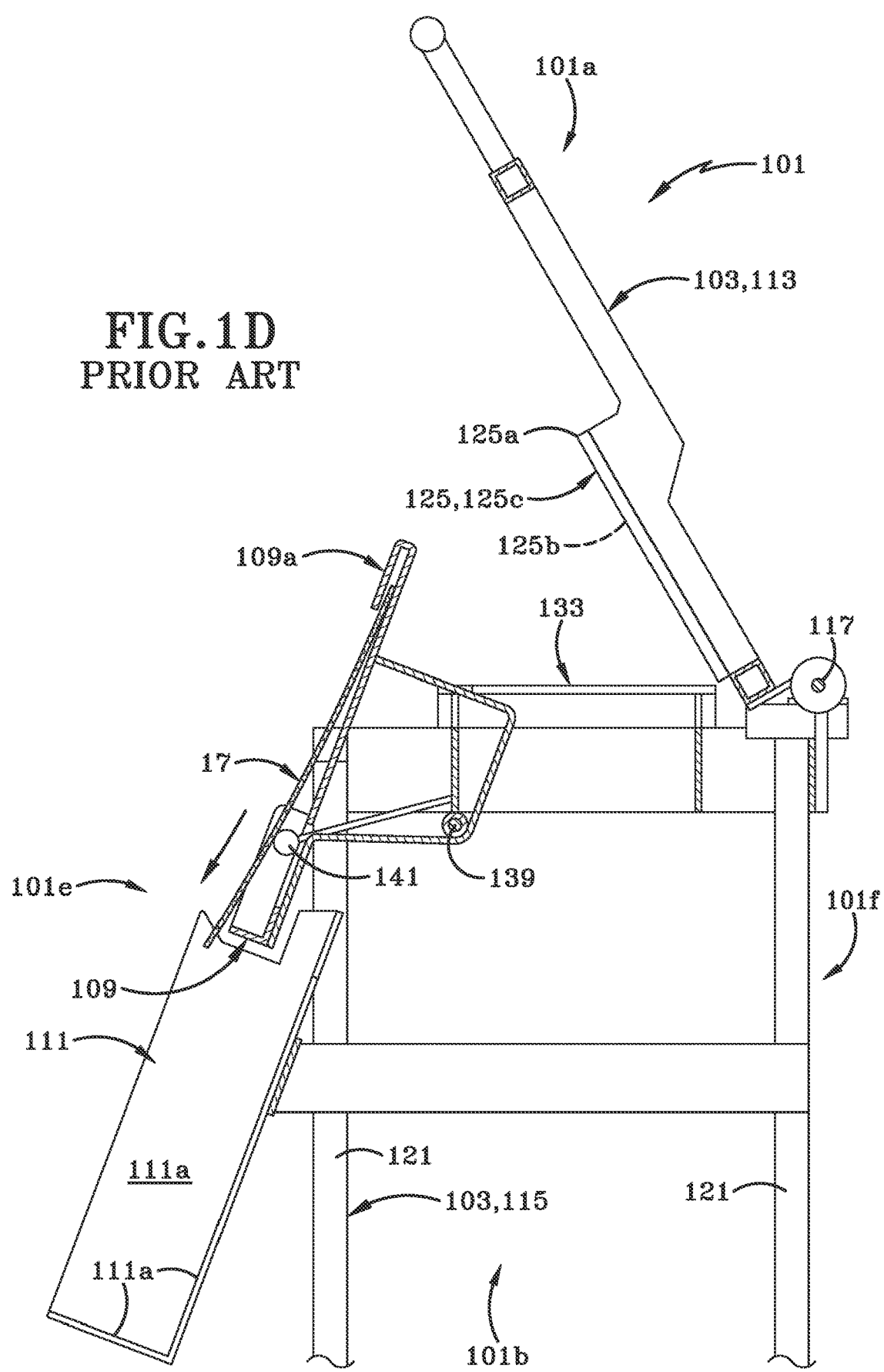
FIG. 1D is an operational view of FIG. 1C showing a support and transfer mechanism being raised to allow the individual shingle-tab to contact a bumper.

In operation, 3-Tab shingles 16 are placed within the support and transfer mechanism 109 and over the plurality of lower blades 107. The 3-Tab shingles are releasably held by the three shingle holders 109a (partially shown in FIG. 1A). The pivotable upper frame 113 is pivoted relative to the lower frame 115 from an open position (FIG. 1) to a closed position (FIG. 1B). The rotation of upper frame 113 lowers the plurality of upper blades 105 to a position where they interact with the plurality of lower blades 107 and cut the 3-Tab shingles 16 into individual shingle tabs 17. When the 3-Tab shingles 16 are cut, two scraps or portions 33a (only one of which is partially shown in FIG. 1B) of the 3-Tab shingles 16 are not held or retained by the support and transfer mechanism 109 and fall through the support and transfer mechanism 109 due to gravity. The scraps or portions 33a are thrown away while the individual shingle tabs 17 are held in the support and transfer mechanism 109 to be released thereafter as more fully described below. After the 3-Tab shingles 16 are cut, the support and transfer mechanism 109 pivots about the second pivot rod 139, as partially shown in FIG. 1D, and the individual shingle tabs 17 slide towards the shingle retainers 111 and contact bumpers 141 which raises the individual shingle tabs 17 and allows the individual shingle tabs 17 to fall into the shingle retainers 111. The operator can then remove the cut individual shingle tabs 17 from the retainers 111 to use on a roof. One of the shortcomings of the PRIOR ART shingle cutting machine 101 is that the shingle retainers 111 and bumpers 141 extend outwardly and forwardly from the lower frame assembly and interfere with the legs of the installer. This makes the machine 101 awkward to use.

Referring to FIG. 4 through FIG. 21, there is shown a first embodiment of a shingle cutting machine in accordance with one aspect of the present disclosure, with the shingle cutting machine generally indicated at 10.

The shingle cutting machine 10 includes a top end 10a and a bottom end 10b defining a vertical direction therebetween, a first side 10c and a second side 10d defining a longitudinal direction therebetween and a front end 10e and a rear end 10f defining a transverse direction therebetween. The shingle cutting machine includes a transverse axis X1 extending transversely through the center of the shingle cutting machine 10.

In accordance with one aspect of the present disclosure, the shingle cutting machine 10 includes at least one blade assembly 12 carried by a frame 14. In one example, the at least one blade assembly 12 is configured to cut 3-Tab shingles 16 (FIG. 2) forming individual shingle tabs 17 (FIG. 3) as further described below.

In one particular embodiment, the at least one blade assembly 12 includes a first upper blade assembly 18, a second upper blade assembly 20, a third upper blade assembly 22, a fourth upper blade assembly 24, a first lower blade assembly 26, a second lower blade assembly 28, a third lower blade assembly 30 and a fourth lower blade assembly 32 each carried by the frame 14.

Figure 7:
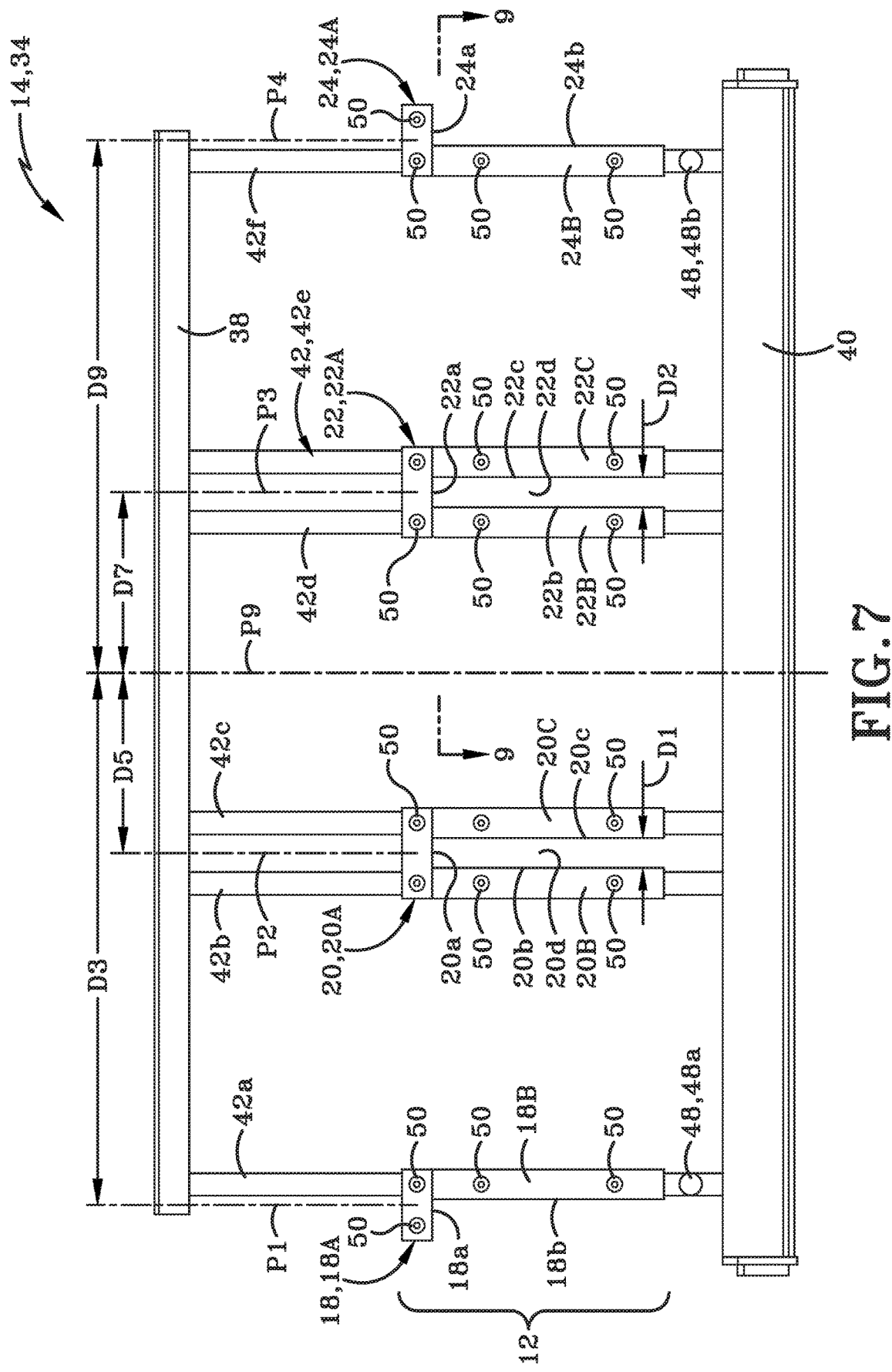
FIG. 7 is a front plan view taken along line 7-7 of FIG. 6.

With primary reference to FIG. 7, the first upper blade assembly 18 is generally L-shaped and includes a first blade body 18A having a longitudinally extending first cutting edge 18a and a second blade body 18B having a transversely extending second cutting edge 18b.

The second upper blade assembly 20 is a generally elongated U-shaped member or open-ended rectangular member. The second upper blade assembly 20 includes a first blade body 20A having a longitudinally extending first cutting edge 20a, a second blade body 20B having a transversely extending second cutting edge 20b, and a third blade body 20C having a transversely extending third cutting edge 20c. The first cutting edge 20a, the second cutting edge 20b and the third cutting edge 20c define a first opening 20d. The first opening 20d is sized to receive a portion of the 3-Tab shingle 16 after the 3-Tab shingle 16 is cut. In one example, the first opening 20d extends a distance D1 from the second cutting edge 20b to the third cutting edge 20c. The distance D1 may be any suitable distance.

The third upper blade assembly 22 is a generally elongated U-shaped member or open-ended rectangular member. The third upper blade assembly 22 includes a first blade body 22A having a longitudinally extending first cutting edge 22a, a second blade body 22B having a transversely extending second cutting edge 22b, and a third blade body 22C having a transversely extending third cutting edge 22c. The first cutting edge 22a, the second cutting edge 22b and the third cutting edge 22c define a second opening 22d. The second opening 22d is sized to receive a portion of the 3-Tab shingle 16 after the 3-Tab shingle 16. In one example, the second opening 22d extends a distance D2 from the second cutting edge 22b to the third cutting edge 22c. The distance D2 may be any suitable distance.

The fourth upper blade assembly 24 is generally L-shaped and includes a first blade body 24A having a longitudinally extending first cutting edge 24a and a second blade body 24B having a transversely extending second cutting edge 24b.

Although the first upper blade assembly 18, the second upper blade assembly 20, the third upper blade assembly 22 and the fourth upper blade assembly 24 have been described as being certain shapes and having a certain number of cutting edges, it is envisioned that the first upper blade assembly 18, the second upper blade assembly 20, the third upper blade assembly 22 and the fourth upper blade assembly 24 may be any suitable shape and have any suitable number of cutting edges. The first upper blade assembly 18, the second upper blade assembly 20, the third upper blade assembly 22 and the fourth upper blade assembly 24 may be made out of stainless steel, carbon steel, tool steel or alloy steel, or any other suitable material.

Figure 8:
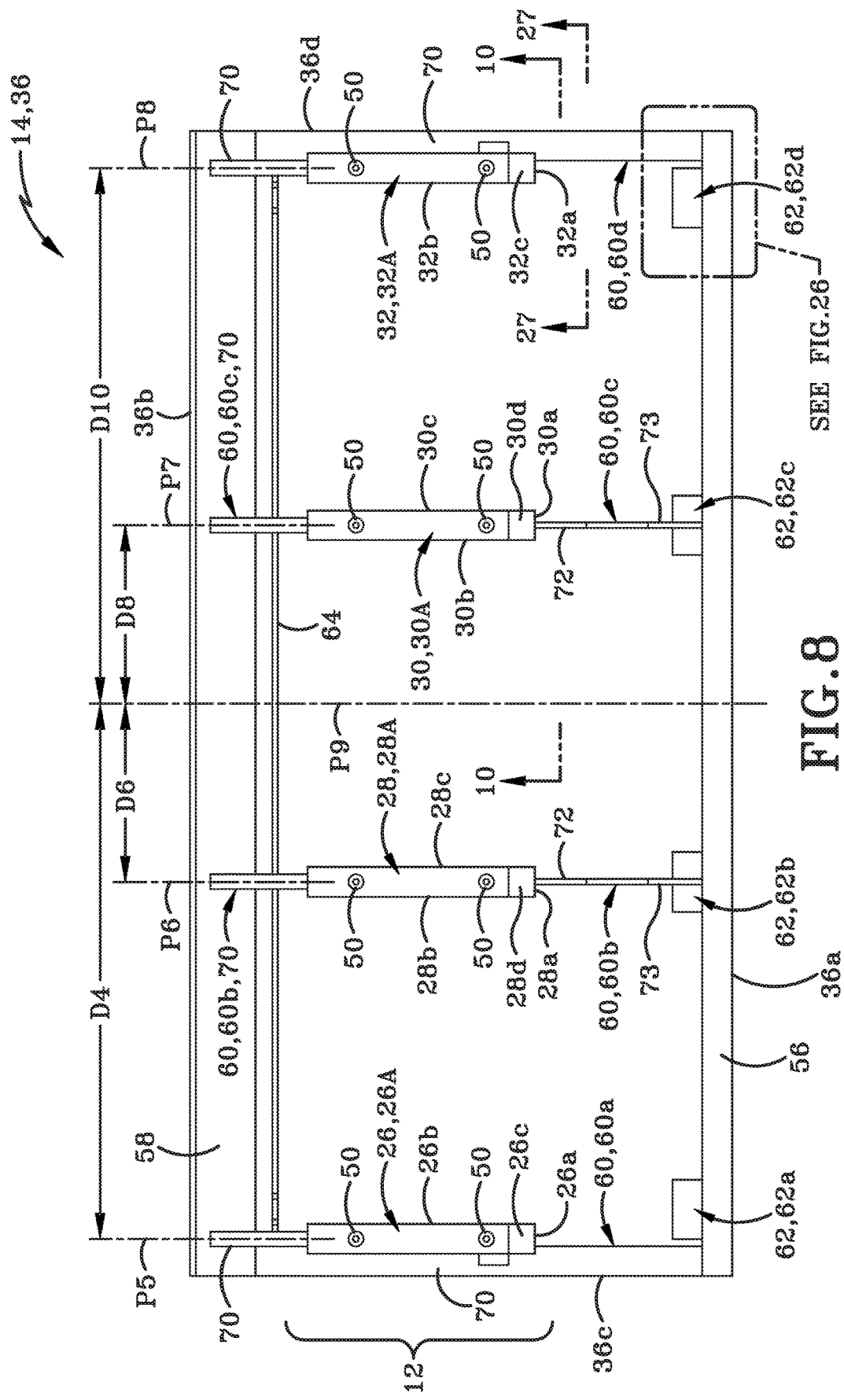
FIG. 8 is a top plan view taken along line 8-8 of FIG. 6.
Figure 9:
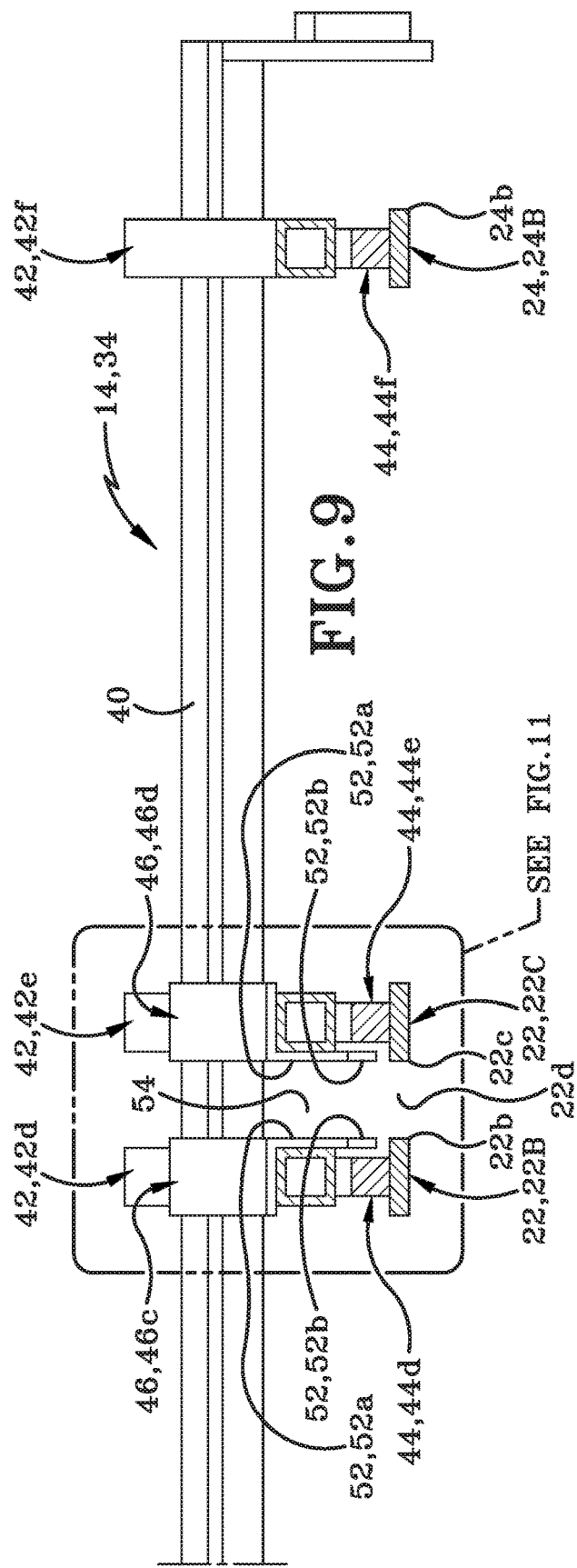
FIG. 9 is a cross-section view taken along line 9-9 of FIG. 7.
Figure 10:
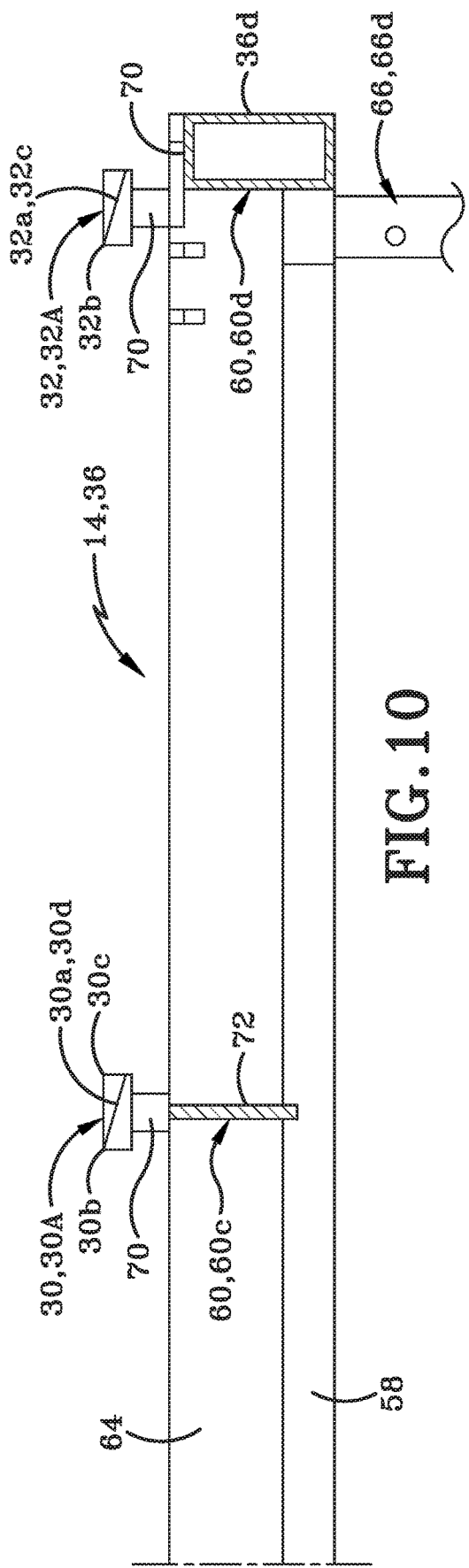
FIG. 10 is a cross-section view taken along line 10-10 of FIG. 8.
Figure 11:
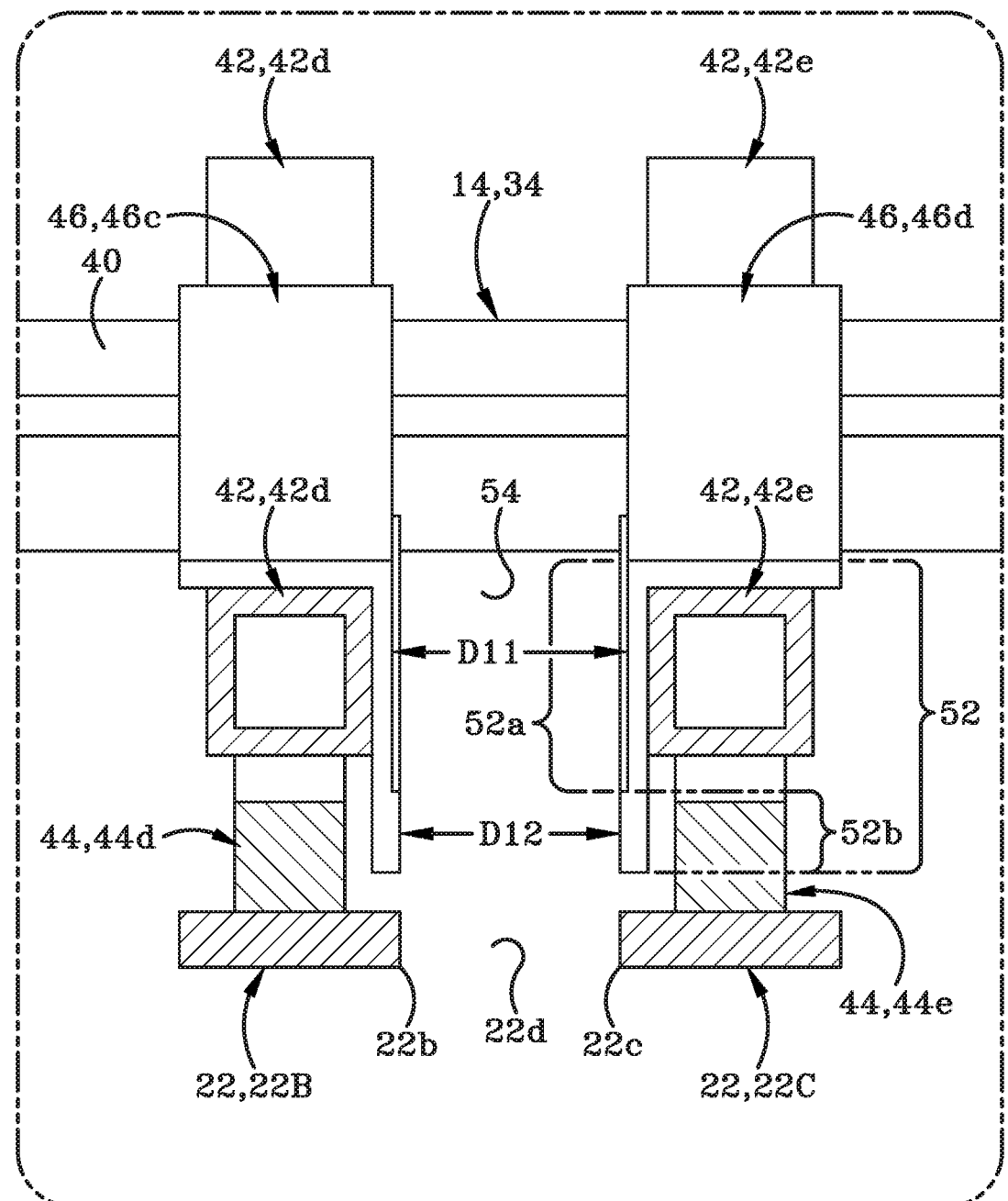
FIG. 11 is an enlarged fragmentary view of a portion of FIG. 9 highlighted by the dashed box labeled SEE FIG. 11.
Figure 12:
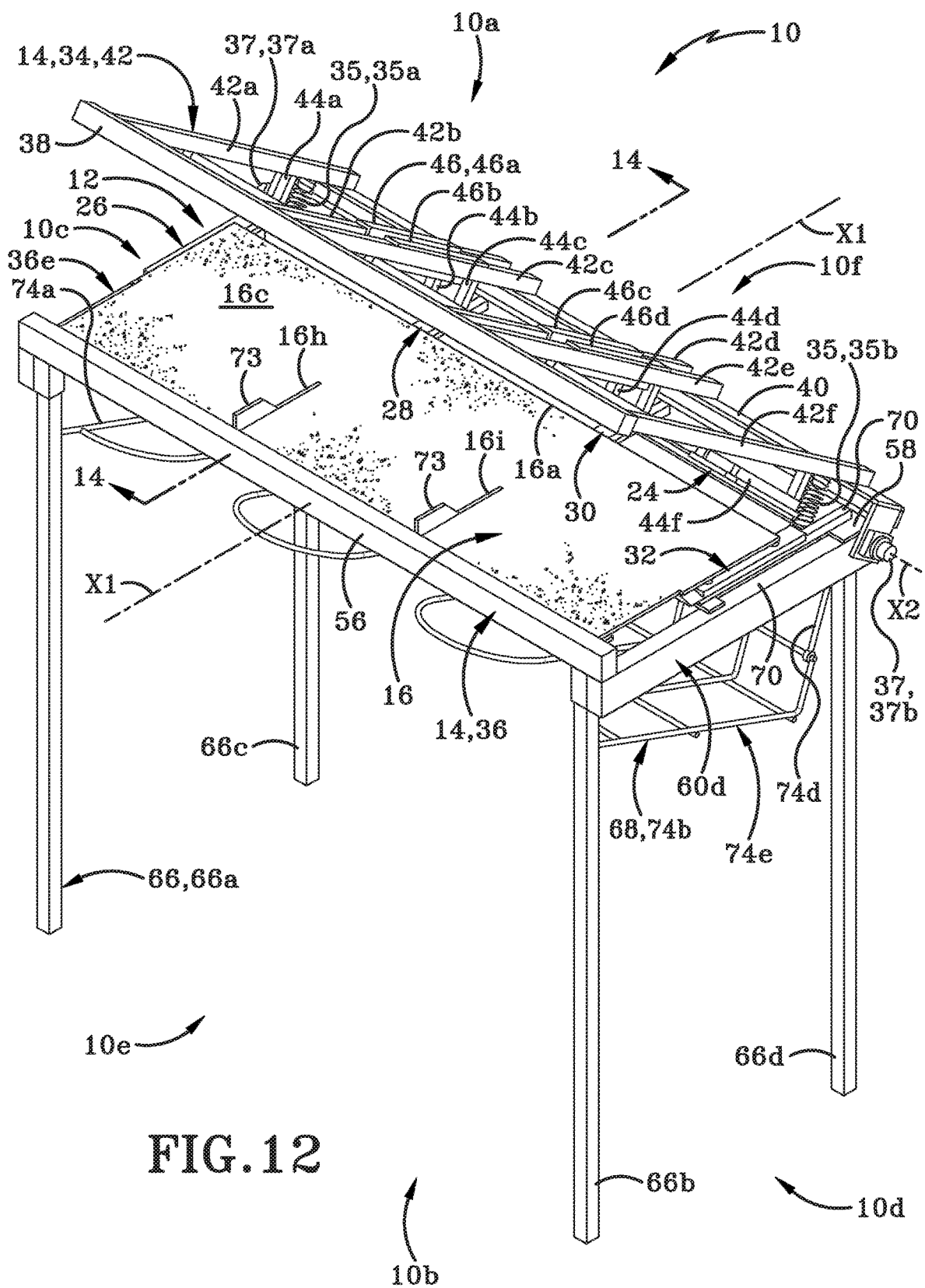
FIG. 12 is a front top right isometric perspective of the shingle cutting machine of FIG. 4 with the 3-Tab shingle placed within the shingle cutting machine.
Figure 13:
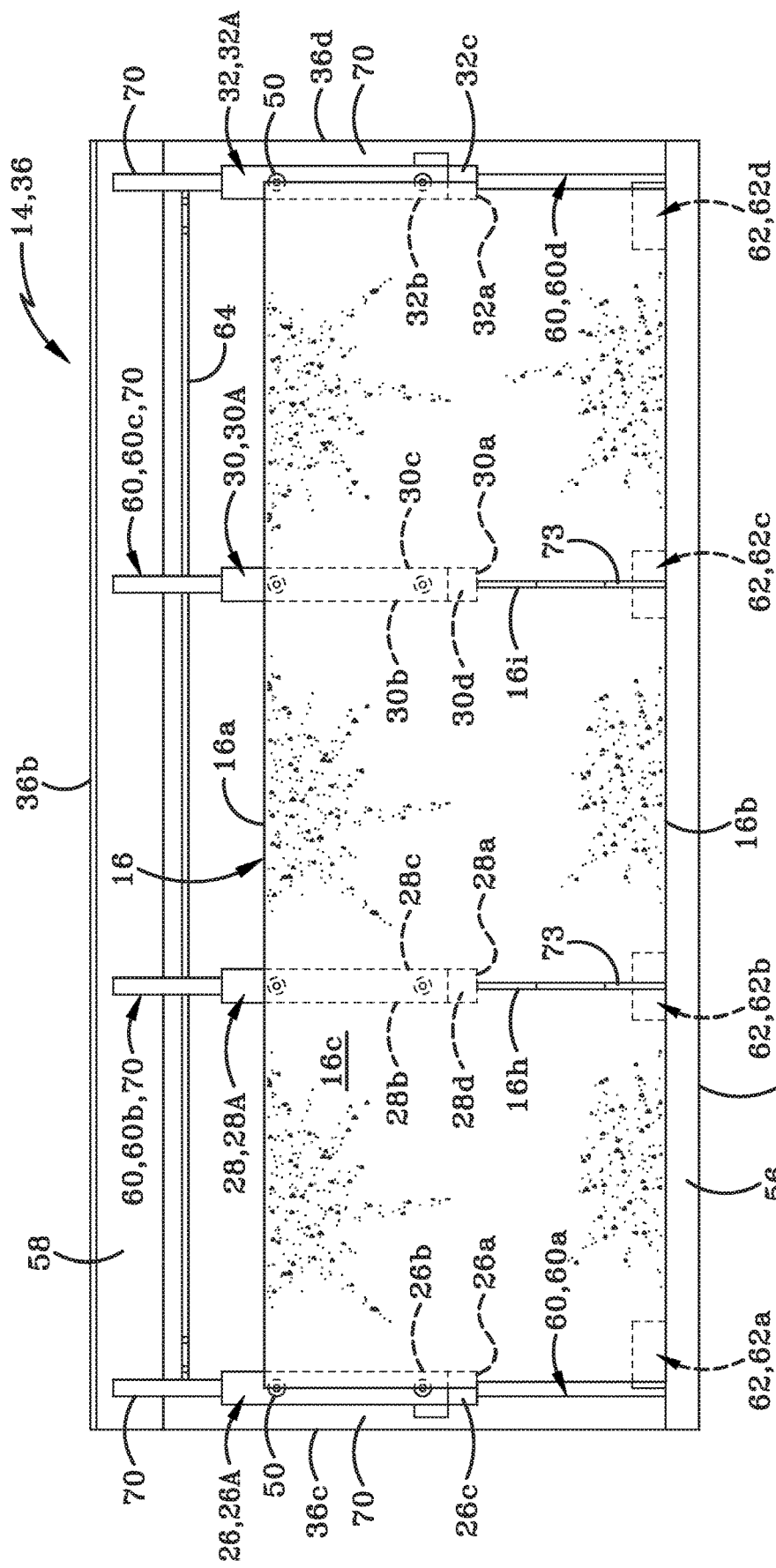
FIG. 13 is the top plan view of FIG. 8 with the 3-Tab shingle placed within the frame of the shingle cutting machine of FIG. 4.
Figure 14:
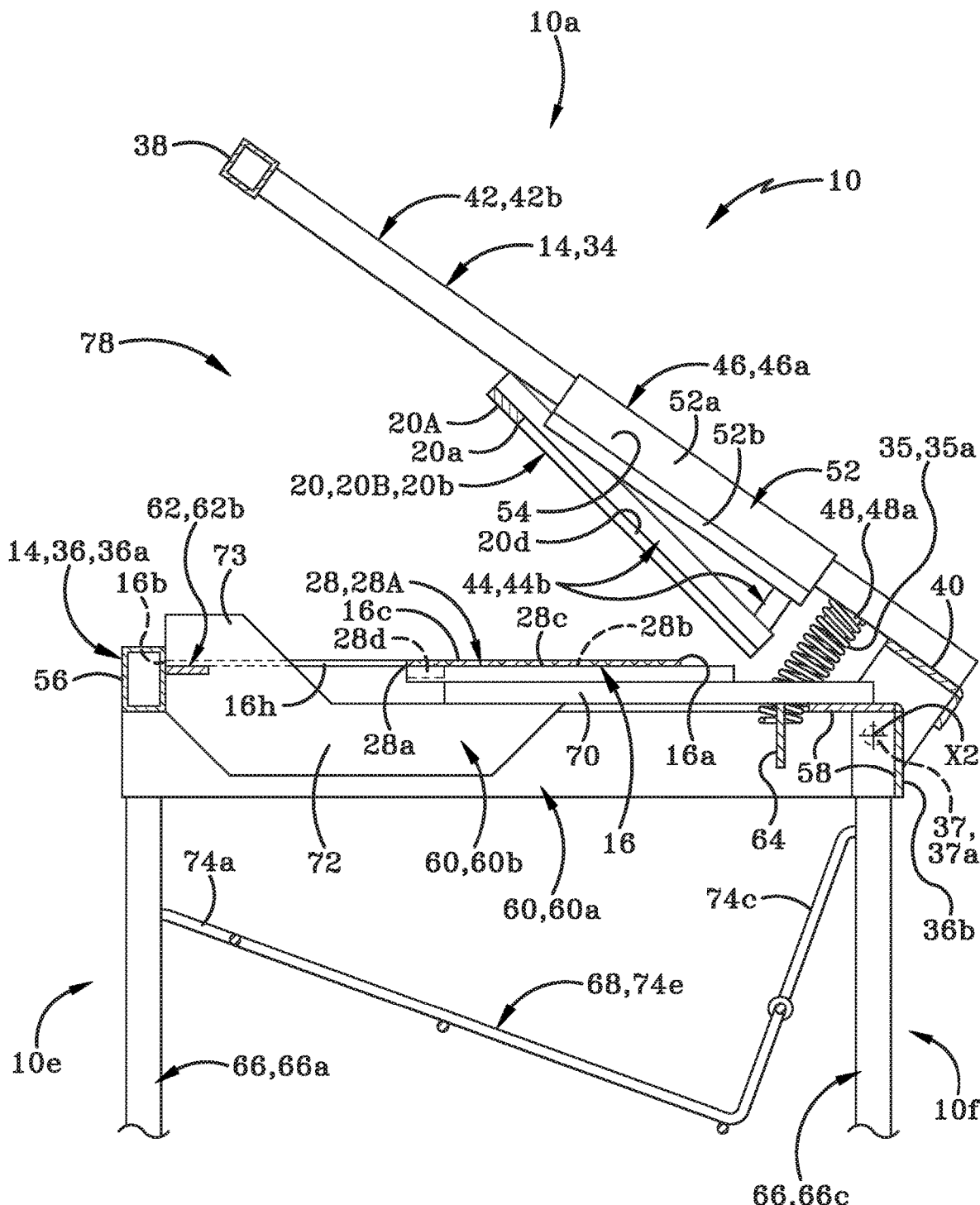
FIG. 14 is a cross-section view taken along line 14-14 of FIG. 12.
Figure 15:
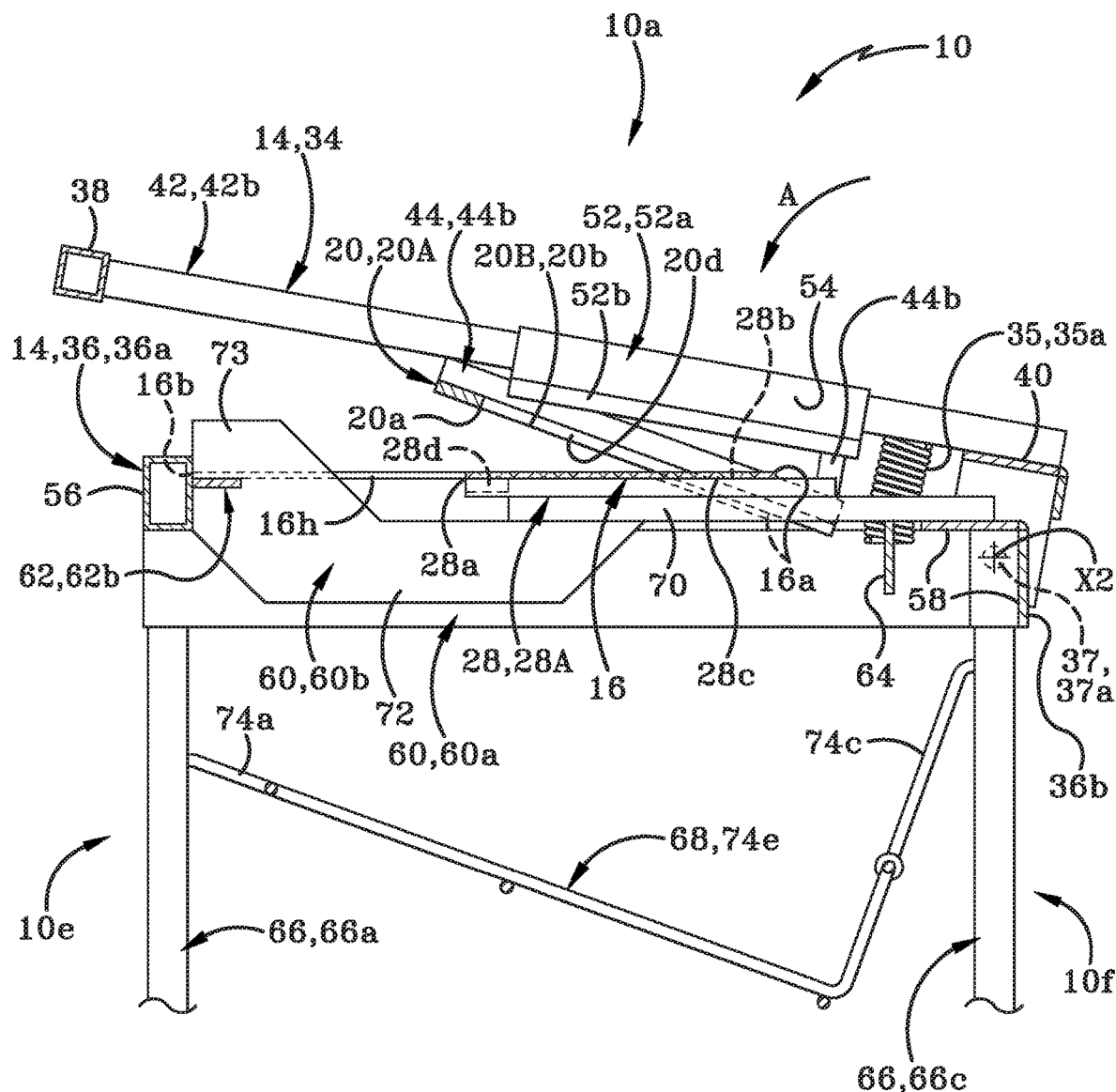
FIG. 15 is an operational view of FIG. 14 showing an upper frame of the shingle cutting machine of FIG. 4 being lowered to cut the 3-Tab shingle.
Figure 16:
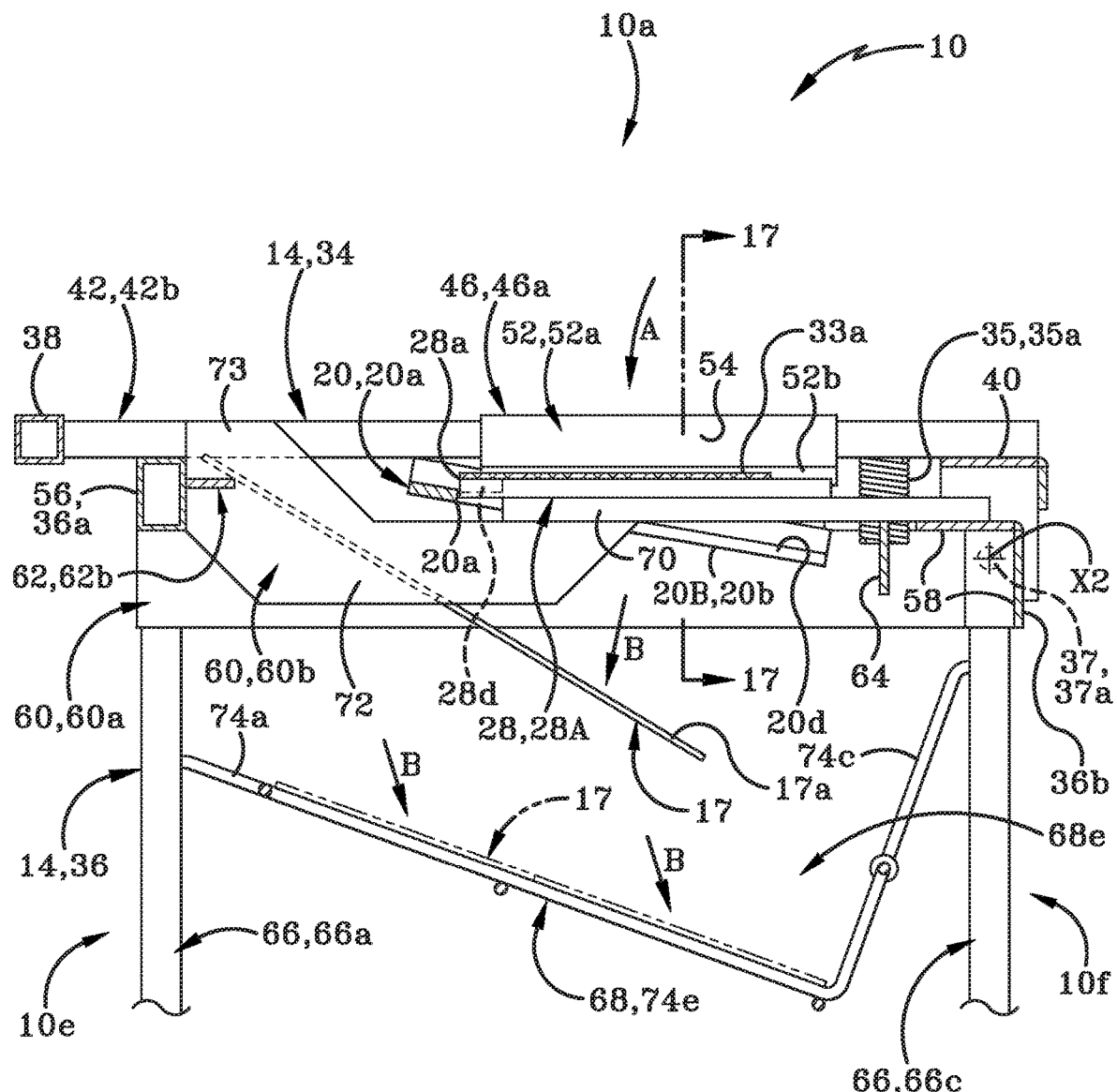
FIG. 16 is an operational view of FIG. 14 showing the upper frame of the shingle cutting machine of FIG. 4 completely lowered.

With primary reference to FIG. 8, the first lower blade assembly 26 is generally rectangular in shape and includes a first blade member 26A having a longitudinally extending first cutting edge 26a, a transversely extending second cutting edge 26b, and a tapered portion 26c which angles downwardly away from the transverse axis X1. In one example, the tapered portion 26c is provided a distance rearwardly from the front edge 36a of the lower frame assembly 36.

The second lower blade assembly 28 is generally rectangular in shape and includes a second blade member 28A having a longitudinally extending first cutting edge 28a, a transversely extending second cutting edge 28b, a transversely extending third cutting edge 28c, and a tapered portion 28d which angles downwardly away from the transverse axis X1. In one example, the tapered portion 28d is provided a distance rearwardly from the front edge 36a of the lower frame assembly 36.

The third lower blade assembly 30 is generally rectangular in shape and includes a third blade member 30A having a longitudinally extending first cutting edge 30a, a transversely extending second cutting edge 30b, a transversely extending third cutting edge 30c, and a tapered portion 30d which angles downwardly away from the transverse axis X1. In one example, the tapered portion 30d is provided a distance rearwardly from the front edge 36a of the lower frame assembly 36.

The fourth lower blade assembly 32 is generally rectangular in shape and includes a fourth blade member 32A having a longitudinally extending first cutting edge 32a, a transversely extending second cutting edge 32b, and a tapered portion 32c which angles downwardly away from the transverse axis X1. In one example, the tapered portion 32c is provided a distance rearwardly from the front edge 36a of the lower frame assembly 36.

Although the first lower blade assembly 26, the second lower blade assembly 28, the third lower blade assembly 30 and the fourth lower blade assembly 32 have been described as being certain shapes and having a certain number of cutting edges, it is envisioned that the first lower blade assembly 26, the second lower blade assembly 28, the third lower blade assembly 30 and the fourth lower blade assembly 32 may be any suitable shape and have any suitable number of cutting edges. The first lower blade assembly 26, the second lower blade assembly 28, the third lower blade assembly 30 and the fourth lower blade assembly 32 may be made out of stainless steel, carbon steel, tool steel or alloy steel, or any other suitable material.

With primary reference to FIG. 7 and FIG. 8, and in one particular embodiment, the shingle cutting machine 10 includes a first imaginary plane P1 extending transversely through the center of the first upper blade assembly 18, a second imaginary plane P2 extending transversely through the center of the second upper blade assembly 20, a third imaginary plane P3 extending transversely through the center of the third upper blade assembly 22, a fourth imaginary plane P4 extending transversely through the center of the fourth upper blade assembly 24, a fifth imaginary plane P5 extending transversely through the center of the first lower blade assembly 26, a sixth imaginary plane P6 extending transversely through the center of the second lower blade assembly 28, a seventh imaginary plane P7 extending transversely through the center of the third lower blade assembly 30, an eighth imaginary plane P8 extending transversely through the center of the fourth lower blade assembly 32 and a ninth imaginary plane P9 extending transversely through the center of the shingle cutting machine 10.

The first upper blade assembly 18 is positioned near the first side 10c of the shingle cutting machine 10 such that the first plane P1 is a distance D3 away from the ninth plane P9. The first lower blade assembly 26 is positioned near the first side 10c of the shingle cutting machine 10 such that the fifth plane P5 is a distance D4 away from the ninth plane P9. The first lower blade assembly 26 is positioned vertically below the first upper blade assembly 18. The first upper blade assembly 18 is aligned with the first lower blade assembly 26 such that the first cutting edge 18a of the first upper blade assembly 18 is aligned with the first cutting edge 26a of the first lower blade assembly 26 and the second cutting edge 18b of the first upper blade assembly 18 is aligned with the second cutting edge 26b of the first lower blade assembly 26.

The second upper blade assembly 20 is positioned such that the second plane P2 is a distance D5 away from the ninth plane P9. The second lower blade assembly 28 is positioned such that the sixth plane P6 is a distance D6 away from the ninth plane P9. The second lower blade assembly 28 is positioned vertically below the second upper blade assembly 20. The second upper blade assembly 20 is aligned with the second lower blade assembly 28 such that the first cutting edge 20a of the second upper blade assembly 20 is aligned with the first cutting edge 28a of the second lower blade assembly 28, the second cutting edge 20b of the second upper blade assembly 20 is aligned with the second cutting edge 28b of the second lower blade assembly 28 and the third cutting edge 20c of the second upper blade assembly 20 is aligned with the third cutting edge 28c of the second lower blade assembly 28.

The third upper blade assembly 22 is positioned such that the third plane P3 is a distance D7 away from the ninth plane P9. The third lower blade assembly 30 is positioned such that the seventh plane P7 is a distance D8 away from the ninth plane P9. The third lower blade assembly 30 is positioned vertically below the third upper blade assembly 22 such that the first cutting edge 22a of the third upper blade assembly 22 is aligned with the first cutting edge 30a of the third lower blade assembly 30, the second cutting edge 22b of the third upper blade assembly 22 is aligned with the second cutting edge 30b of the third lower blade assembly 30 and the third cutting edge 22c of the third upper blade assembly 22 is aligned with the third cutting edge 30c of the third lower blade assembly 30.

The fourth upper blade assembly 24 is positioned such that the fourth plane P4 is a distance D9 away from the ninth plane P9. The fourth lower blade assembly 32 is positioned such that the eighth plane P8 is a distance D10 away from the ninth plane P9. The fourth lower blade assembly 32 is positioned vertically below the fourth upper blade assembly 24 such that the first cutting edge 24a of the fourth upper blade assembly 24 is aligned with the first cutting edge 32a of the fourth lower blade assembly 32 and the second cutting edge 24b of the fourth upper blade assembly 24 is aligned with the second cutting edge 32b of the fourth lower blade assembly 32.

In one example, distance D3 and D9 is equal, distance D5 and distance D7 is equal, distance D4 and distance D10 is equal, and distance D6 and distance D8 is equal; however distances D3, D4, D5, D6, D7, D8, D9 and D10 may be any suitable distances.

In accordance with one aspect of the present disclosure, the frame 14 includes an upper frame assembly 34, a biasing mechanism 35, a lower frame assembly 36 and a pivot mechanism 37. The upper frame assembly 34 includes a longitudinally extending front support member 38, a longitudinally extending rear support member 40, at least one transversely extending intermediate support member 42, at least one transversely extending mounting bracket 44, at least one transversely extending channel plate 46 and at least one vertically extending upper anchor mechanism 48.

Figure 4:
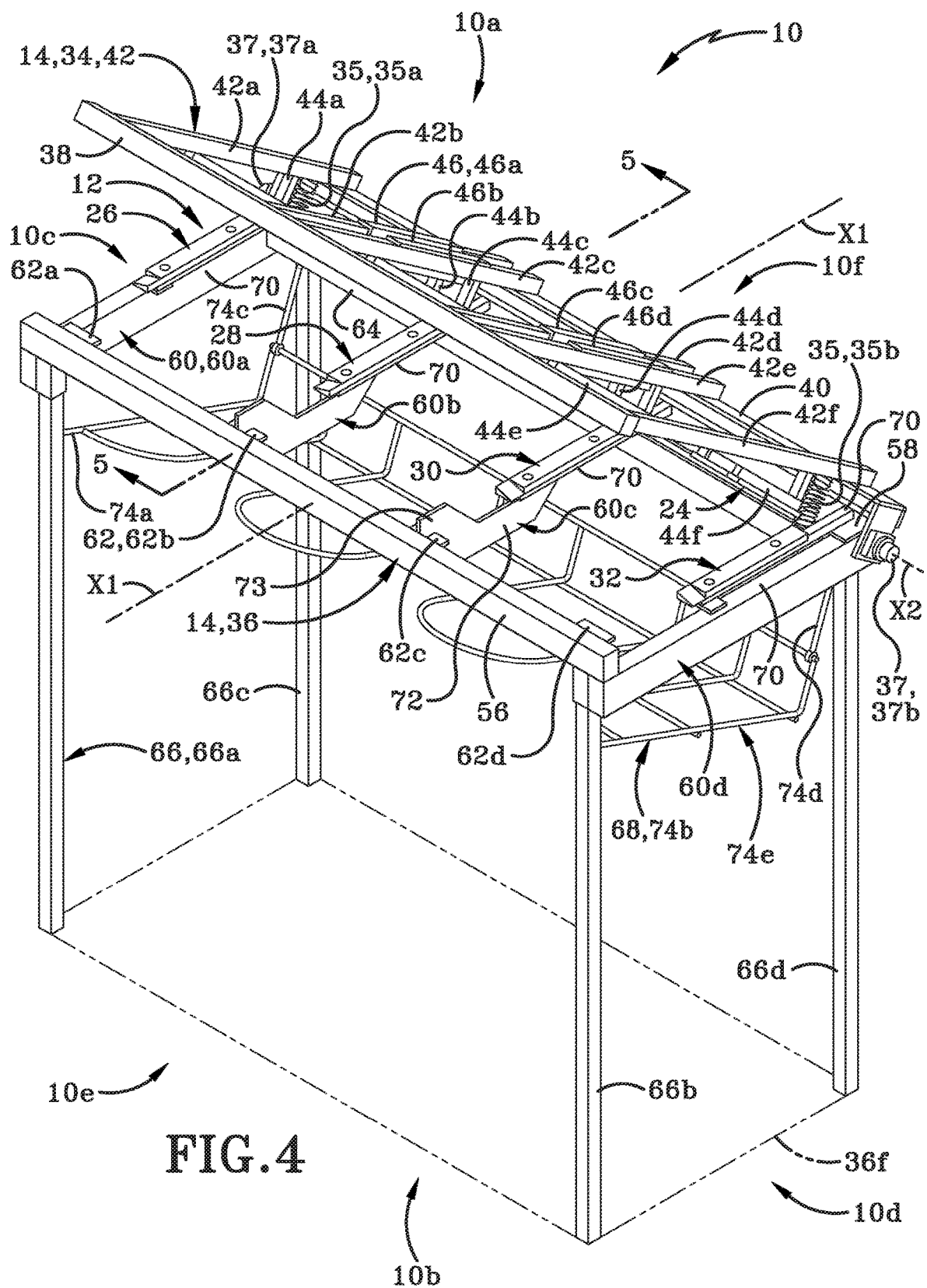
FIG. 4 is a front top right side isometric perspective view of a first embodiment of a shingle cutting machine in accordance with the present disclosure.
Figure 5:
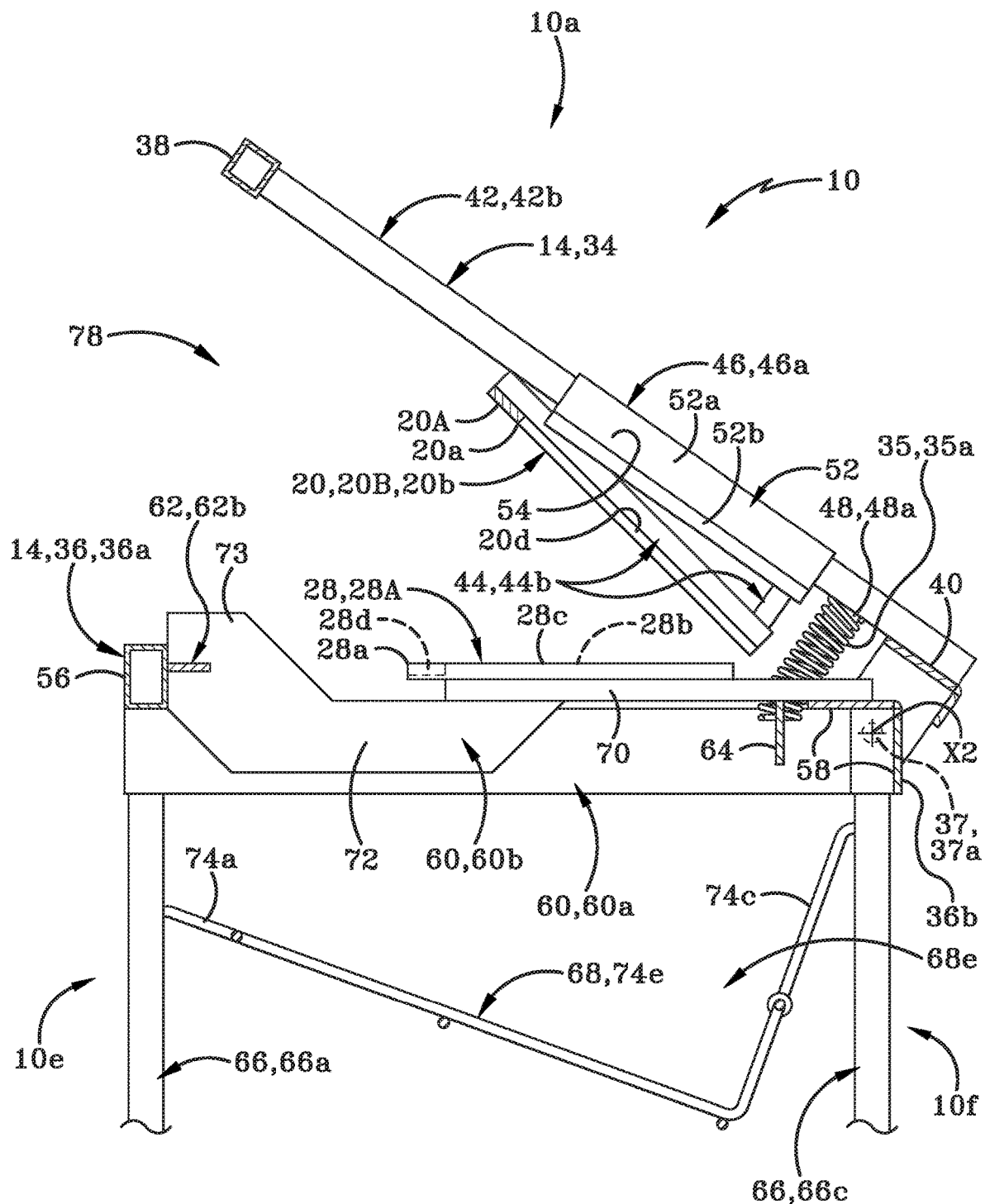
FIG. 5 is a cross-section taken along line 5-5 of FIG. 2.
Figure 6:
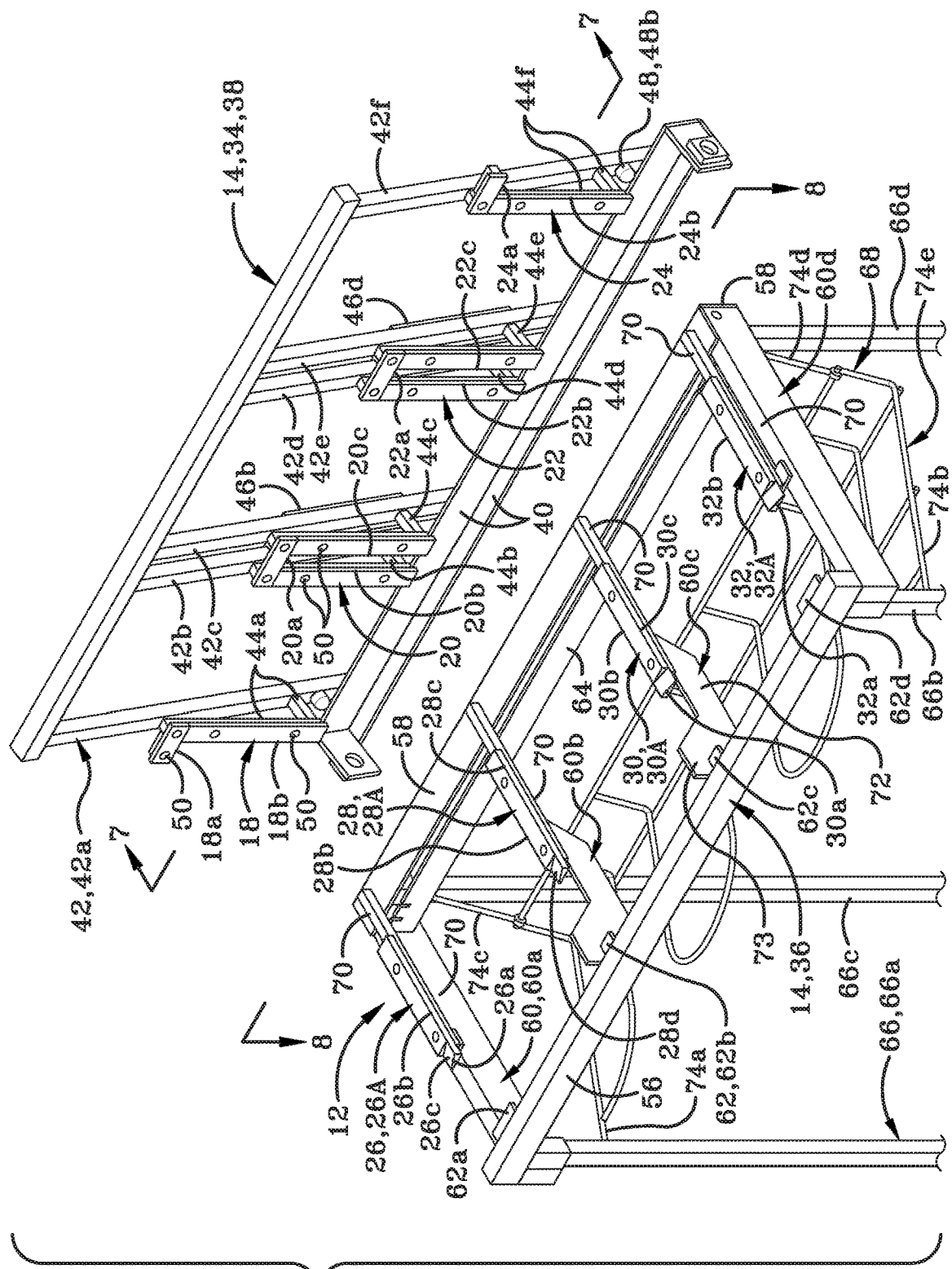
FIG. 6 is a front top right exploded isometric perspective view of the shingle cutting machine of FIG. 4 with some components removed for clarity.

In one particular embodiment, and as shown at least in FIG. 4, the upper frame assembly 34 includes six transversely extending intermediate support members 42a, 42b, 42c, 42d, 42e and 42f fixedly secured to the front support member 38 and the rear support member 40 via welding; however, the six intermediate support members 42a, 42b, 42c, 42d, 42e and 42f may be fixedly secured in any suitable manner. The six intermediate support members 42a, 42b, 42c, 42d, 42e and 42f are spaced apart and generally parallel to one another.

In one particular embodiment, the upper frame assembly 34 includes six transversely extending mounting brackets 44a, 44b, 44c, 44d, 44e and 44f fixedly secured to a bottom surface of the intermediate support members 42a, 42b, 42c, 42d, 42e and 42f via welding; however, the mounting brackets 44a, 44b, 44c, 44d, 44e and 44f may be fixedly secured in any other suitable manner. More particularly, mounting bracket 44a is fixedly secured to intermediate support member 42a, mounting bracket 44b is fixedly secured to intermediate support member 42b, mounting bracket 44c is fixedly secured to intermediate support member 42c, mounting bracket 44d is fixedly secured to intermediate support member 42d, mounting bracket 44e is fixedly secured to intermediate support member 42e, mounting bracket 44f is fixedly secured to intermediate support member 42f.

In one particular embodiment, the upper frame assembly 34 includes four transversely extending channel plates 46a, 46b, 46c, and 46d fixedly secured to a top surface of the intermediate support members 42b, 42c, 42d and 42e. More particularly, channel plate 46a is fixedly secured to intermediate support member 42b, channel plate 46b is fixedly secured to intermediate support member 42c, channel plate 46c is fixedly secured to intermediate support member 42d and channel plate 46d is fixedly secured to intermediate support member 42e. As such, channel plate 46a is proximate channel plate 46b and channel plate 46c is proximate channel plate 46d. Each channel plate 46a, 46b, 46c, and 46d includes a channel portion 52 extending vertically downward from a top surface of the channel plates 46a, 46b, 46c and 46d. The channel portion 52 includes a first portion 52a and a second portion 52b. The channel portion 52 of channel plate 46a is facing the channel portion 52 of channel plate 46b such that the first portion 52a of channel plate 46a is aligned with first portion 52a of channel plate 46b and the second portion 52b of channel plate 46a is aligned with the second portion 52b of channel plate 46b defining a channel 54. The first portion 52a of channel plate 46a is a distance D11 (FIG. 11) from the first portion 52a of channel plate 46b. The second portion 52b of channel plate 46a is a distance D12 (FIG. 11) from the second portion 52b of channel plate 46b. In one example, distance D11 is greater than distance D12; however, distance D11 and D12 may be any suitable distance. The channel portion 52 of channel plate 46c and channel plate 46d are substantially identical to the channel portion 52 of channel plate 46a and channel plate 46d and thus, for brevity purposes, will not be described herein.

In one particular embodiment, the first upper blade assembly 18, the second upper blade assembly 20, the third upper blade assembly 22 and the fourth upper blade assembly 24 are removably secured to the mounting brackets 44a, 44b, 44c, 44d, 44e, and 44f via fasteners 50, such as threaded bolts; however it is envisioned that the first upper blade assembly 18, the second upper blade assembly 20, the third upper blade assembly 22 and the fourth upper blade assembly 24 may be removably secured to the mounting brackets 44a, 44b, 44c, 44d, 44e, and 44f in any suitable manner.

More particularly, and as shown at least in FIG. 4, the first upper blade assembly 18 is removably secured to mounting bracket 44a at an angle relative to the transverse axis X1 of the shingle cutting machine 10. The second upper blade assembly 20 is removably secured to mounting brackets 44b and 44c at an angle relative to the transverse axis X1 of the shingle cutting machine 10. The third upper blade assembly 22 is removably secured to mounting brackets 44d and 44e at an angle relative to the transverse axis X1 of the shingle cutting machine 10. The fourth upper blade assembly 24 is removably secured to mounting bracket 44f at an angle relative to the transverse axis X1 of the shingle cutting machine 10. The angles may be any suitable angles.

The lower frame assembly 36 includes a front edge 36a, a rear edge 36b, a first side edge 36c, a second side edge 36d, and a transverse center axis, which is the same as the transverse axis X1 of the shingle cutting machine 10. The lower frame assembly 36 defines a receiving area 36e (FIG. 12) adapted to receive a shingle therein. In one example, the receiving area 36e remains in a fixed orientation relative to the lower frame assembly 36. The lower frame assembly 36 further includes a longitudinally extending front support member 56, a longitudinally extending rear support member 58, at least one transversely extending intermediate support member 60, at least one placement mechanism 62, at least one notched lower anchor mechanism 64, at least one leg 66 and a retaining mechanism 68.

In one particular embodiment, and as shown at least in FIG. 4, the lower frame assembly 36 includes four transversely extending intermediate support members 60a, 60b, 60c and 60d fixedly secured to the front support member 56 and the rear support member 58 via welding; however, the four intermediate support members 60a, 60b, 60c and 60d may be fixedly secured in any suitable manner. The four intermediate support members 60a, 60b, 60c and 60d are spaced apart and generally parallel to one another. Each intermediate support member 60a, 60b, 60c and 60d includes a mounting portion 70. Intermediate support member 60b and 60c each contain a recessed portion 72 and an aligning portion 73, which may also be referred to as a plate. The recessed portion 72 is provided between the mounting portion 70 and the aligning portion 73 and the recessed portion 72 is vertically lower than the mounting portion 70 and the aligning portion 73. The aligning portion 73 is vertically higher than the mounting portion 70 and the recessed portion 72 and is proximate the front support member 56 of the lower frame assembly 36. The aligning portion 73 is used to align the 3-Tab shingle 16 as further described below.

In one particular embodiment, the first lower blade assembly 26, the second lower blade assembly 28, the third lower blade assembly 30 and the fourth lower blade assembly 32 are removably secured to the four intermediate support members 60a, 60b, 60c and 60d via fasteners 50, such as threaded bolts; however it is envisioned that the first lower blade assembly 26, the second lower blade assembly 28, the third lower blade assembly 30 and the fourth lower blade assembly 32 may be removably secured to the four intermediate support members 60a, 60b, 60c and 60d in any suitable manner.

More particularly, and as shown at least in FIG. 4, the first lower blade assembly 26 is removably secured to the mounting portion 70 of intermediate support member 60a parallel to the transverse axis X1 of the shingle cutting machine 10. The first lower blade assembly 28 is removably secured to the mounting portion 70 of intermediate support member 60b parallel to the transverse axis X1 of the shingle cutting machine 10. The third lower blade assembly 30 is removably secured to the mounting portion 70 of intermediate support member 60c parallel to the transverse axis X1 of the shingle cutting machine 10. The fourth lower blade assembly 32 is removably secured to the mounting portion 70 of intermediate support member 60d parallel to the transverse axis X1 of the shingle cutting machine 10. The aligning portion 73 of intermediate support member 60b and 60c extends vertically upward.

In one particular embodiment, the lower frame assembly 36 includes four placement mechanisms 62a, 62b, 62c and 62d fixedly secured to the front support member 56 via welding; however, the four placement mechanisms 62a, 62b, 62c and 62d may be fixedly secured in any suitable manner. The four placement mechanisms 62a, 62b, 62c and 62d extends transversely away from the front support member 56 and are spaced apart and generally parallel to one another. In one example, the four placement mechanisms 62a, 62b, 62c and 62d are metal plates; however, the four placement mechanisms 62a, 62b, 62c and 62d may be any suitable placement mechanisms.

In one particular embodiment, the lower frame assembly 36 includes four vertically extending legs 66a, 66b, 66c and 66d fixedly secured to the front support member 56 and the rear support member 58 via welding; however, the four legs 66a, 66b, 66c and 66d may be fixedly secured in any suitable manner. More particularly, leg 66a and leg 66b are fixedly secured to the front support member 56 and are spaced apart and generally parallel to one another. Legs 66c and leg 66d are fixedly secured to the rear support member 58 and are spaced apart and generally parallel to one another. The lower frame assembly 36 defines a perimeter 36f bounded by an outside portion of the vertically extending legs 66a, 66b, 66c, and 66d, and as shown in FIG. 4.

In one particular embodiment, the retaining mechanism 68 is provided in a collection area 68e which is defined vertically below the receiving area 36e. The collection area 68e is adapted to receive a shingle tab cut from a shingle as further described below. The retaining mechanism 68 further includes four mounting portions 74a, 74b, 74c and 74d and a retaining portion 74e. The retaining mechanism 68 is fixedly secured to the legs 66a, 66b, 66c, 66d via mechanical retention; however the retaining mechanism 68 may be fixedly secured in any suitable manner. More particularly, each leg 66a, 66b, 66c and 66d includes an aperture (not shown) sized to receive the mounting portions 74a, 74b, 74c and 74d of the retaining mechanism 68. Specifically, mounting portion 74a is inserted into aperture of leg 66a and mechanically retained, mounting portion 74b is inserted into aperture 74 of leg 66b and mechanically retained, mounting portion 74c is inserted into aperture 74 of leg 66c and mechanically retained and mounting portion 74d is inserted into aperture 74 of leg 66d and mechanically retained. The retaining mechanism 68 is positioned such that the retaining portion 74e of the retaining mechanism 68 is vertically below the first lower blade assembly 26, the second lower blade assembly 28, the third lower blade assembly 30 and the fourth lower blade assembly 32.

In one particular embodiment, the upper frame assembly 34 includes two upper anchor mechanisms 48a and 48b fixedly secured to the rear support member 40 via welding; however, the two upper anchor mechanisms 48a and 48b may be fixedly secured in any suitable manner. The two upper anchor mechanisms 48a and 48b extend vertically downward from the rear support member 40 with upper anchor mechanism 48a positioned proximate the first side 10c of the shingle cutting machine 10 and upper anchor mechanism 48b positioned proximate the second side 10d of the shingle cutting machine 10. In one example, the upper anchor mechanisms 48a and 48b are a metal protrusion, however, upper anchor mechanisms 48a and 48b may be any suitable anchor mechanisms.

In one particular embodiment, the lower frame assembly 36 includes two notched lower anchor mechanisms 64a and 64b within the rear support member 58. The two lower anchor mechanisms 64a and 64b extend vertically upward from the rear support member 58 with lower anchor mechanism 64a positioned proximate the first side 10c of the shingle cutting machine 10 and lower anchor mechanism 64b positioned proximate the second side 10d of the shingle cutting machine 10. In one example, the lower anchor mechanisms 64a and 64b are a notch within the rear support member 58; however, lower anchor mechanisms 64a and 64b may be any suitable anchor mechanisms.

In one particular embodiment, the frame 14 includes two biasing mechanisms 35a and 35b fixedly secured to the upper anchor mechanisms 48a and 48b and the lower anchor mechanisms 64a and 64b via an interference-fit connection; however, the two biasing mechanisms 35a and 35b may be fixedly secured in any suitable manner. More particularly, biasing mechanism 35a is fixedly secured to upper anchor mechanism 48a and lower anchor 64a and biasing mechanism 35b is fixedly secured to upper anchor mechanism 48b and lower anchor mechanism 64b. In one example, the biasing mechanisms 35a and 35b are springs; however, biasing mechanisms 35a and 35b may be any suitable biasing mechanisms.

In one particular embodiment, the frame 14 includes two pivot mechanisms 37a and 37b. In one example, the upper frame assembly 34 is pivotally coupled to the lower frame assembly 36 via the pivot mechanisms 37a and 37b. More particularly, pivot pin 37a enters holes (not shown) formed in the upper frame assembly 34 and the lower frame assembly 36 proximate the first side 10c of the shingle cutting machine and pivot pin 37b enters holes (not shown) formed in the upper frame assembly 34 and the lower frame assembly 36 proximate the second side 10d of the shingle cutting machine. The pivot pins 37a and 37b allow the upper frame assembly 34 to pivot about a pivot axis X2 while the lower frame assembly 36 remains stationary.

With reference to FIG. 4-FIG. 21, and in operation, the upper frame assembly 34 includes a shingle loading position where the upper frame assembly 34 is biased at an angle relative to the transverse axis X1 by biasing mechanisms 35a and 35b. While the shingle cutting machine 10 is in the shingle loading position the 3-Tab shingle 16 is positioned on the lower frame assembly 36 to be cut into individual shingle tabs 17.

More particularly, the rear surface 16d of the 3-Tab shingle 16 is positioned on the first lower blade assembly 26, the second lower blade assembly 28, the third lower blade assembly 30, the fourth lower blade assembly 32 and each of the placement mechanisms 62a, 62b, 62c and 62d. The 3-Tab shingle 16 is further positioned such that the aligning portions 73 of intermediate support member 60b and 60c are between the two slots 16h and 16i and the bottom edge 16b of the 3-Tab shingle 16 is proximate the front support member 56 of the lower frame assembly 36.

In one example, and with primary reference to FIG. 14-FIG. 16, FIG. 18-FIG. 19, and FIG. 21, the upper frame assembly 34 is moved from the shingle loading position in a general direction indicated by arrow "A" (FIG. 15) to a shingle cutting position which lowers the first upper blade assembly 18, the second upper blade assembly 20, the third upper blade assembly 22 and the fourth upper blade assembly 24 to interact with the first lower blade assembly 26, the second lower blade assembly 28, the third lower blade assembly 30 and the fourth lower blade assembly 32 to cut the three tab-shingle 16 into individual shingle tabs 17. More particularly, first cutting edge 18a interacts with first cutting edge 26a, second cutting edge 18b interacts with second cutting edge 26b, first cutting edge 20a interacts with first cutting edge 28a, second cutting edge 20b interacts with second cutting edge 28b, third cutting edge 20c interacts with third cutting edge 28c, first cutting edge 22a interacts with first cutting edge 30a, second cutting edge 22b interacts with second cutting edge 30b, third cutting edge 22c interacts with third cutting edge 30c, first cutting edge 24a interacts with first cutting edge 32a and second cutting edge 24b interacts with second cutting edge 32b.

Figure 18:
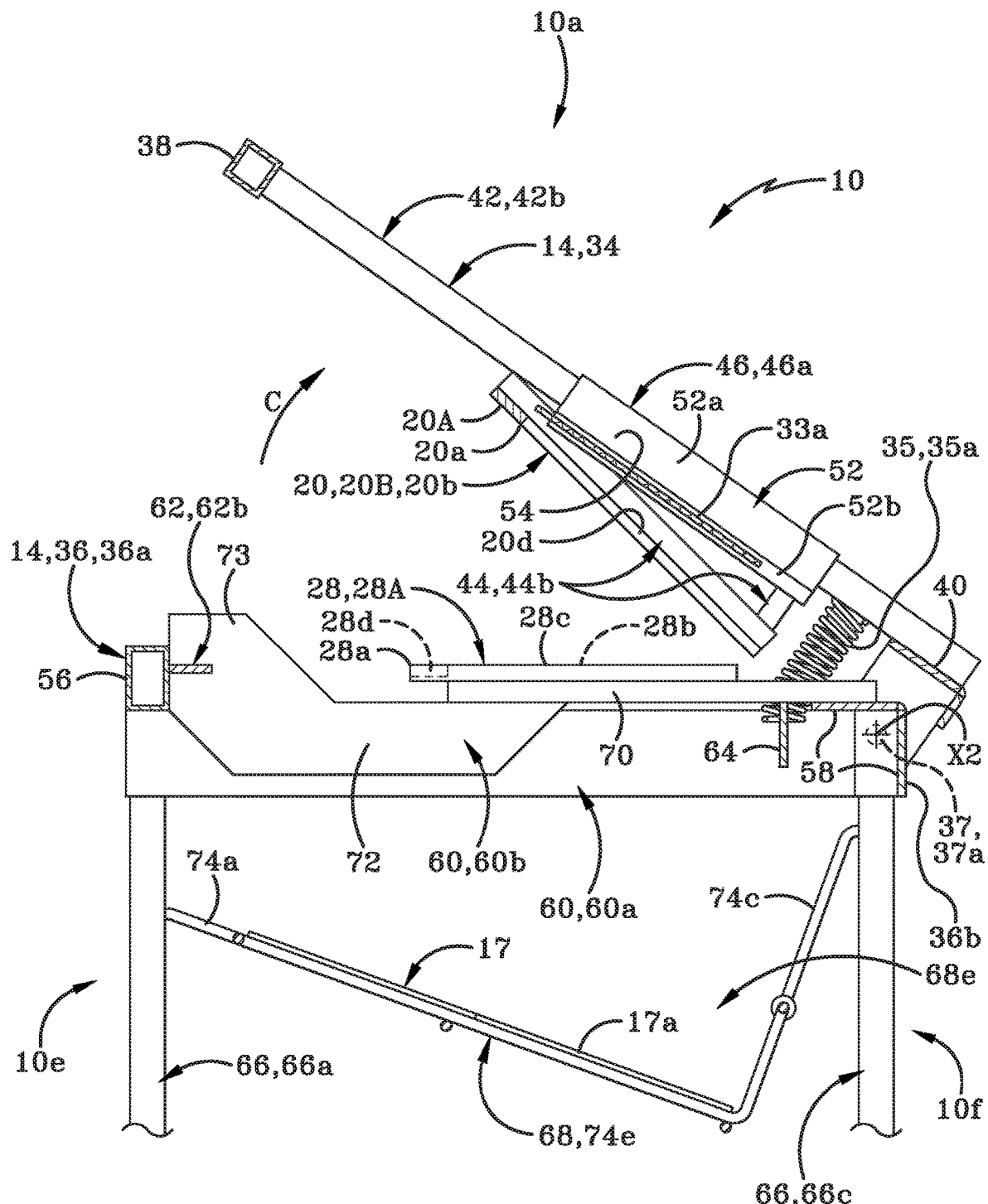
FIG. 18 is an operational view of FIG. 14 showing the upper frame of the shingle cutting machine of FIG. 4 being raised.
Figure 19:
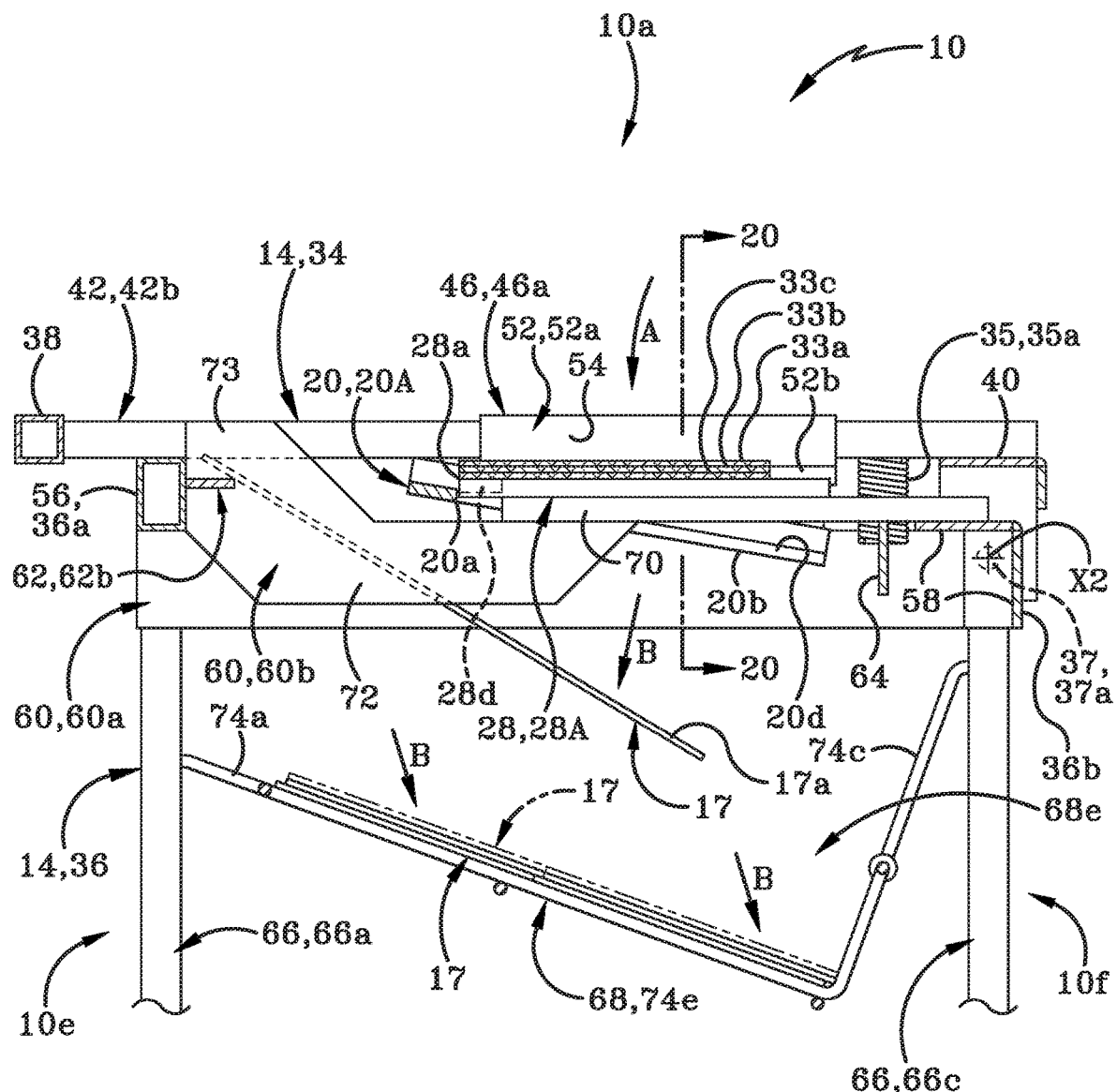
FIG. 19 is an operational view of FIG. 14 showing the upper frame of the shingle cutting machine of FIG. 4 completely lowered.
Figure 21:
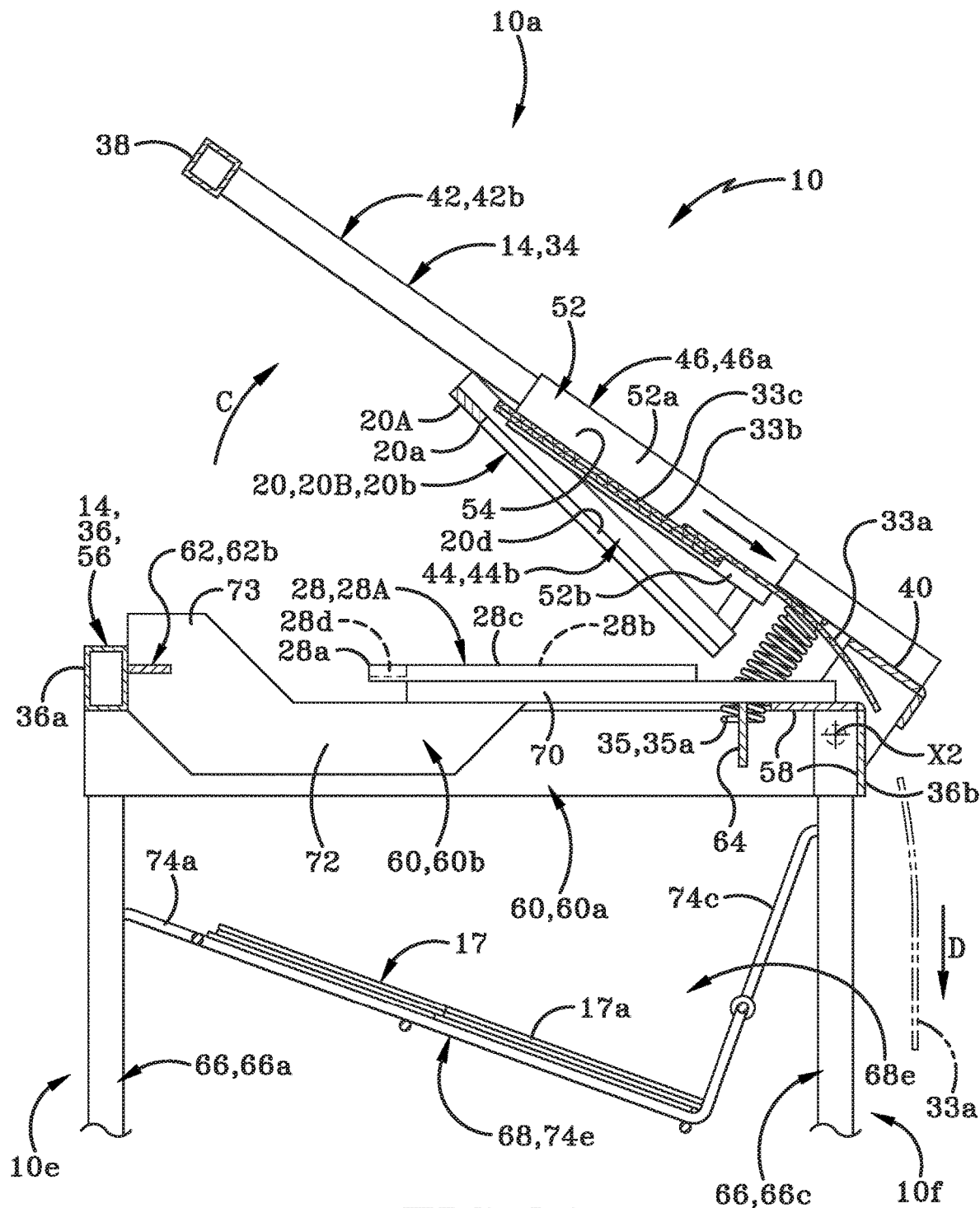
FIG. 21 is an operational view of FIG. 14 showing the upper frame of the shingle cutting machine of FIG. 4 being raised.

As the 3-Tab shingle 16 is cut into three individual shingle tabs 17, the three individual shingle tabs 17 fall in a general direction indicated by arrow "B" (FIG. 16 and FIG. 19) due to gravity into the retaining portion 74e of the retaining mechanism 68. After the 3-Tab shingle 16 is cut, the upper frame assembly 34 is moved back toward the shingle loading position in a general direction indicated by arrow "C" (FIG. 18 and FIG. 21).

For brevity, and with reference to FIG. 17, FIG. 20, and FIG. 21, the operation of channel plates 46a, 46b, 46c and 46d will be explained with reference to channel plates 46a and 46b; however, channel plates 46c and 46d operate in a substantially identical manner. As the 3-Tab shingle 16 is cut, a scrap or a portion 33a goes through the first opening 20d and is releasably retained by the second portion 52b of channel plate 46a and the second portion 52b of channel plate 46b within channel 54 (FIG. 17). As an operator cuts an additional 3-Tab shingle 16, an additional portion 33b goes through the first opening 20d and is releasably retained by the second portion 52b of channel plate 46a and the second portion 52b of channel plate 46b within channel 54 (FIG. 20). As shown in FIG. 20, portion 33b pushes portion 33a in a vertical direction towards the first portion 52a of channel plate 46a and the first portion of channel plate 46b. As an operator cuts an additional 3-Tab shingle 16, an additional portion 33c goes through the first opening 20d and is releasably retained by the second portion 52b of channel plate 46a and the second portion 52b of channel plate 46b within channel 54. As shown in FIG. 21, portion 33c pushes portion 33b in a vertical direction towards the first portion 52a of channel plate 46a and the first portion of channel plate 46b and portion 33b pushes portion 33a into the channel 54 between first portion 52a of channel plate 46a and the first portion 52a of channel plate 46b. Since portion 33a is no longer held by the first portion 52a of channel plate 46a and the first portion of channel plate 46b, portion 33a slides towards the rear end 10f of the shingle cutting machine 10 when the upper frame assembly 34 is biased back towards the shingle loading position after cutting the 3-Tab shingle 16. Portion 33a then falls due to gravity in a general direction indicated by arrow "D" (FIG. 21). The process may then be repeated until a desired number of 3-Tab shingles have been cut.

Still further, the first upper blade assembly 18, the second upper blade assembly 20, the third upper blade assembly 22 and the fourth upper blade assembly 24 are positioned to interact with the first lower blade assembly 26, the second lower blade assembly 28, the third lower blade assembly 30 and the fourth lower blade assembly 32 to create a notch 17a (FIG. 3) in the individual shingle tabs 17. The notch 17a is beneficial as it allows the individual shingle tabs 17 to easily overlap one another.

Although the operation of the shingle cutting machine 10 has been described as being suitable to cut 3-Tab shingles into individual tabs of shingles, it is envisioned that the shingle cutting machine 10 may be configured to cut any suitable types of shingles into any suitable shingle tabs or other shingle portions.

Referring to FIG. 22 and FIG. 24A-FIG. 24D, there is shown a second embodiment of a shingle cutting machine in accordance with one aspect of the present disclosure, with the shingle cutting machine generally indicated at 200. Shingle cutting machine 200 is substantially identical to shingle cutting machine 10 of FIG. 4-FIG. 21 in structure and function with a few exceptions/additions that will be discussed hereafter in greater detail.

Figure 22:
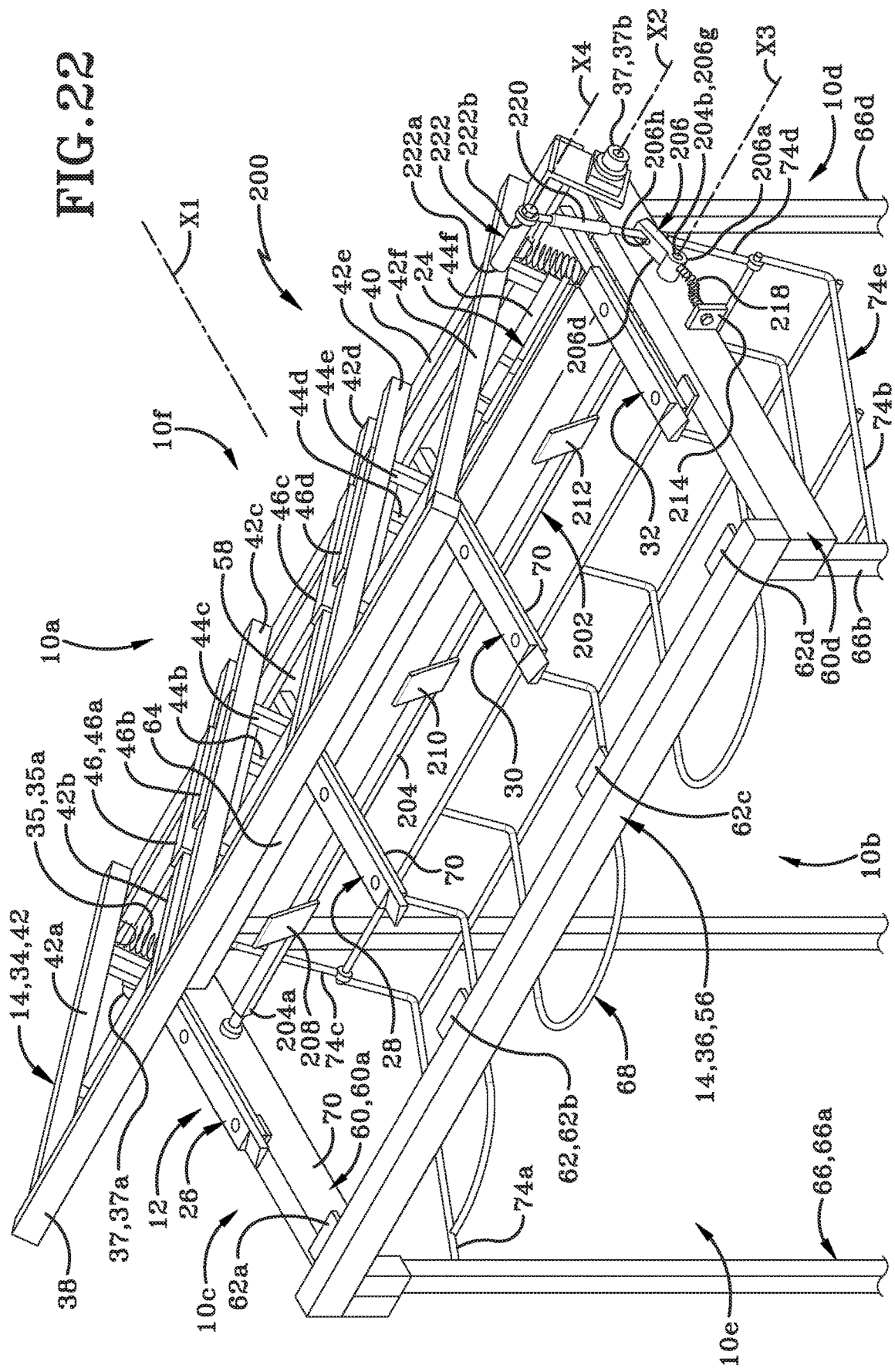
FIG. 22 is a front top right side isometric perspective view of a second embodiment of a shingle cutting machine in accordance with the present disclosure.
Figure 23:
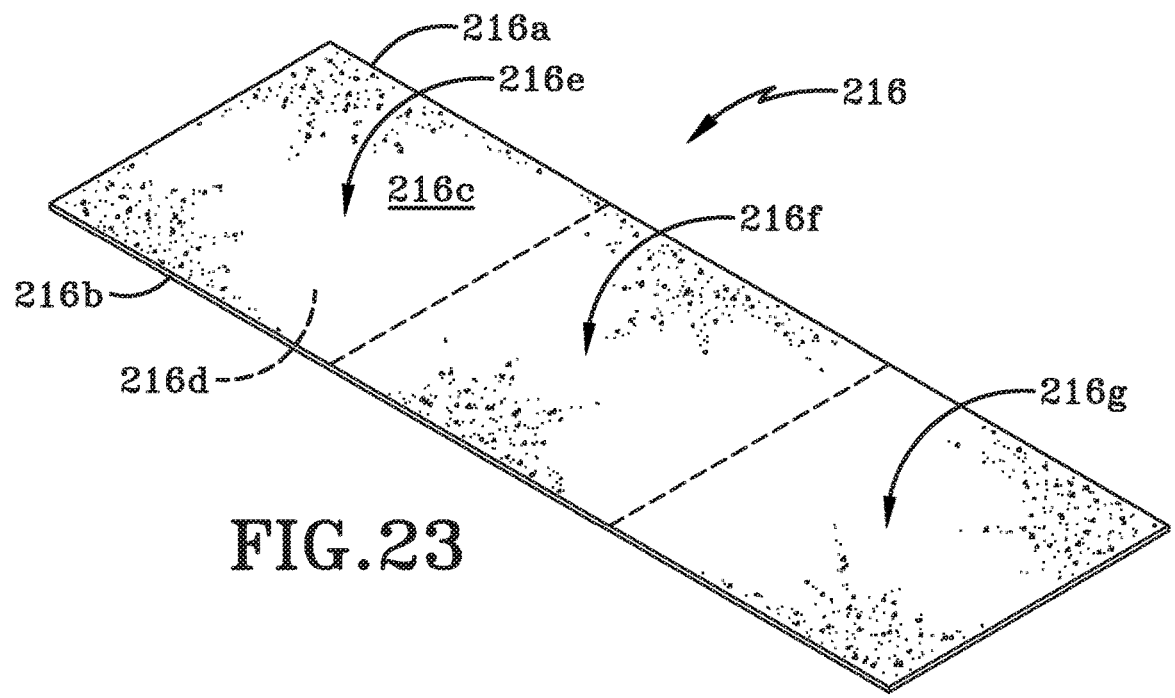
FIG. 23 is a front top right isometric perspective view of a perforated 3-Tab shingle.
Figure 25:
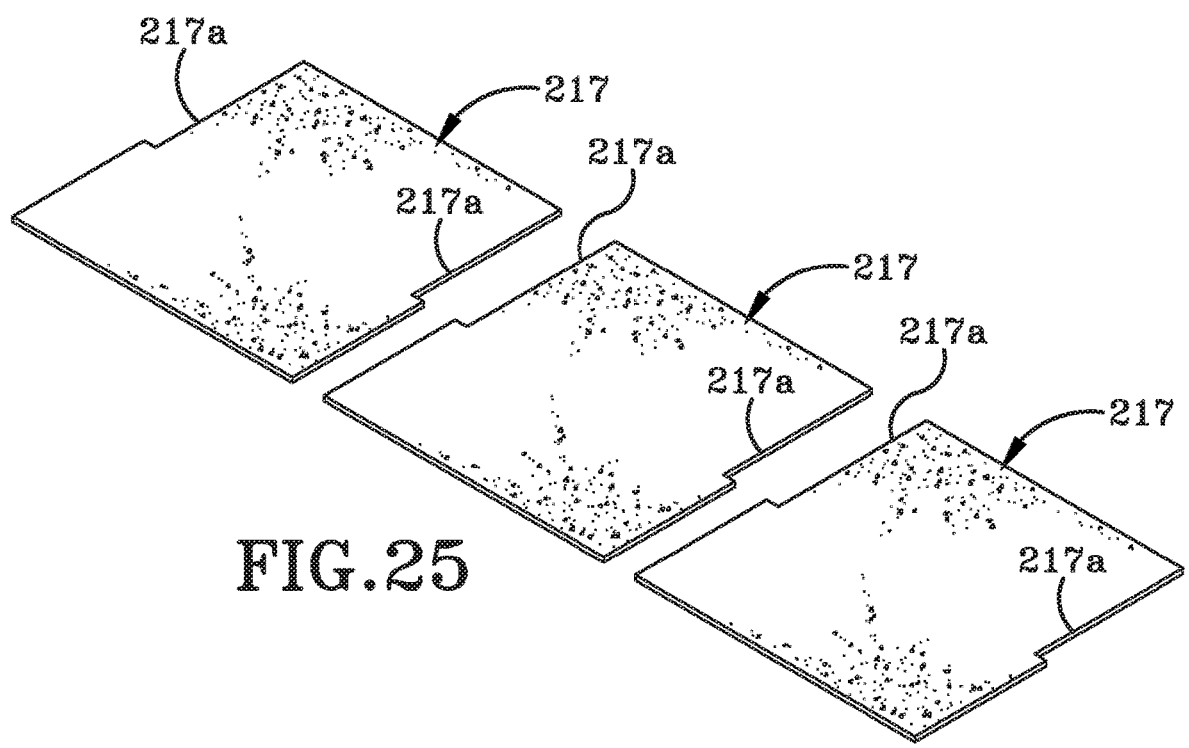
FIG. 25 is a front top right isometric perspective view of individual shingle tabs having notches cut from the perforated 3-Tab shingle.

With primary reference to FIG. 22, recessed portion 72 and aligning portion 73 of intermediate support member 60b and 60c of shingle cutting machine 10 have been removed, and, therefore, the shingle cutting machine 200 only includes mounting portion 70 of intermediate support member 60b and 60c. Recessed portion 72 and aligning portion 73 of intermediate support member 60b and 60c of shingle cutting machine 200 have been removed to accommodate perforated 3-Tab shingles 216 (FIG. 23), which generally include a top edge 216a, a bottom edge 216b, a front surface 216c, a rear surface 216d and three tabs 216e, 216f and 216g separated by two perforations 216h and 216i. In one example, shingle cutting machine 200 is configured to cut the perforated 3-Tab shingles 216 (FIG. 23) forming individual shingle tabs 217 (FIG. 25) as further described below.

With primary reference to FIG. 22 and FIG. 24A-FIG. 24D, shingle cutting machine 200 further includes a support and release assembly 202. Support and release assembly 202 includes a support rod 204 and a lever mechanism 206. Support rod 204 is a generally elongated longitudinally extending member that includes a first end 204a and a second end 204b. Lever mechanism 206 includes a first end 206a, a second end 206b, a first side 206c, a second side 206d, a top wall 206e, a bottom wall 206f, an aperture 206g proximate the first end 206a and extending through first side 206c and second side 206d, a slot 206h proximate second end 206b and extending through the top wall 206e and the bottom wall 206f, and a projection 206i extending generally outwardly from first end 206a. First end 204a of support rod 204 is pivotably coupled to intermediate support member 60a via a bushing 205 and second end 204b of support rod 204 extends through intermediate support member 60d and is fixedly attached within aperture 206g of lever mechanism 206 via a bushing (not shown). Support rod 204 and lever mechanism 206 are pivotable about a pivot axis X3 as more fully described below.

Support and release assembly 202 further includes a first plate 208, a second plate 210, and a third plate 212. First plate 208 is a generally rectangular member and is operably engaged with support rod 204 approximately midway between first lower blade assembly 26 and second lower blade assembly 28 and extends generally outwardly from support rod 204. Second plate 210 is a generally rectangular member and is operably engaged with support rod 204 approximately midway between second lower blade assembly 28 and a third lower blade assembly 30 and extends generally outwardly from support member 204. Third plate 212 is a generally rectangular member and is operably engaged with support rod 204 approximately midway between third lower blade assembly 30 and fourth lower blade assembly 32 and extends generally outwardly from support member 204. First plate 208, second plate 210, and a third plate 212 are pivotable about pivot axis X3 as more full described below.

Support and release assembly 202 further includes a mounting plate 214, a bolt 216, a spring 218, a push-pull rod 220, and a sleeve 222. Mounting plate 214 is a generally rectangular member and is mounted to intermediate support member 60d proximate second side 10d of shingle cutting machine 200. Mounting plate 214 includes a first wall 214a, a second 214b, an aperture 214c extending between the first wall 214a and the second wall 214b. Bolt 216 extends in a transverse direction through aperture 214c such that a portion of bolt 216 extends transversely away from second wall 214b. Spring 218 is operably engaged with bolt 216 on one end and projection 206i of lever mechanism 206 on the other end. Push-pull rod 220 includes a first end 220a, a second end 220b, a first contact mechanism 220c, and a second contact mechanism 220d. Sleeve 222 includes a first end 222a and a second end 222b. First end 222a of sleeve 222 is operably engaged with intermediate support member 42f and extends longitudinally away therefrom. Second end 222b of sleeve is operably engaged with first end 220a of push-pull rod 220. Push-pull rod 220 and sleeve 222 are pivotable about a pivot axis X4 as more fully described below. Push-pull rod 220 extends through slot 206h such that first contact mechanism 220c is provided below bottom 206f of lever mechanism 206 and second contact mechanism 220d is provided above top 206e of lever mechanism 206.

In operation, the shingle cutting machine 200 operates in a substantially identical manner to shingle cutting machine 10 except that the shingle cutting machine 200 is adapted to cut perforated 3-Tab shingles 216 instead of 3-Tab shingles 16 having two slots 16h and 16i. As such, the perforated 3-Tab shingles 216 do not need to be positioned relative to the aligning portions 73, which have been removed from shingle cutting machine 200.

Thus, in operation, the perforated 3-Tab shingle 216 is positioned on the lower frame assembly 36 to be cut into individual shingle tabs 217. More particularly, the rear surface 216d of the perforated 3-Tab shingle 216 is positioned on the first lower blade assembly 26, the second lower blade assembly 28, the third lower blade assembly 30, the fourth lower blade assembly 32 and each of the placement mechanisms 62a, 62b, 62c and 62d. The perforated 3-Tab shingle 216 is further positioned such that the bottom edge 216b of the perforated 3-Tab shingle 216 is proximate the front support member 56 of the lower frame assembly 36.

Figure 24B:
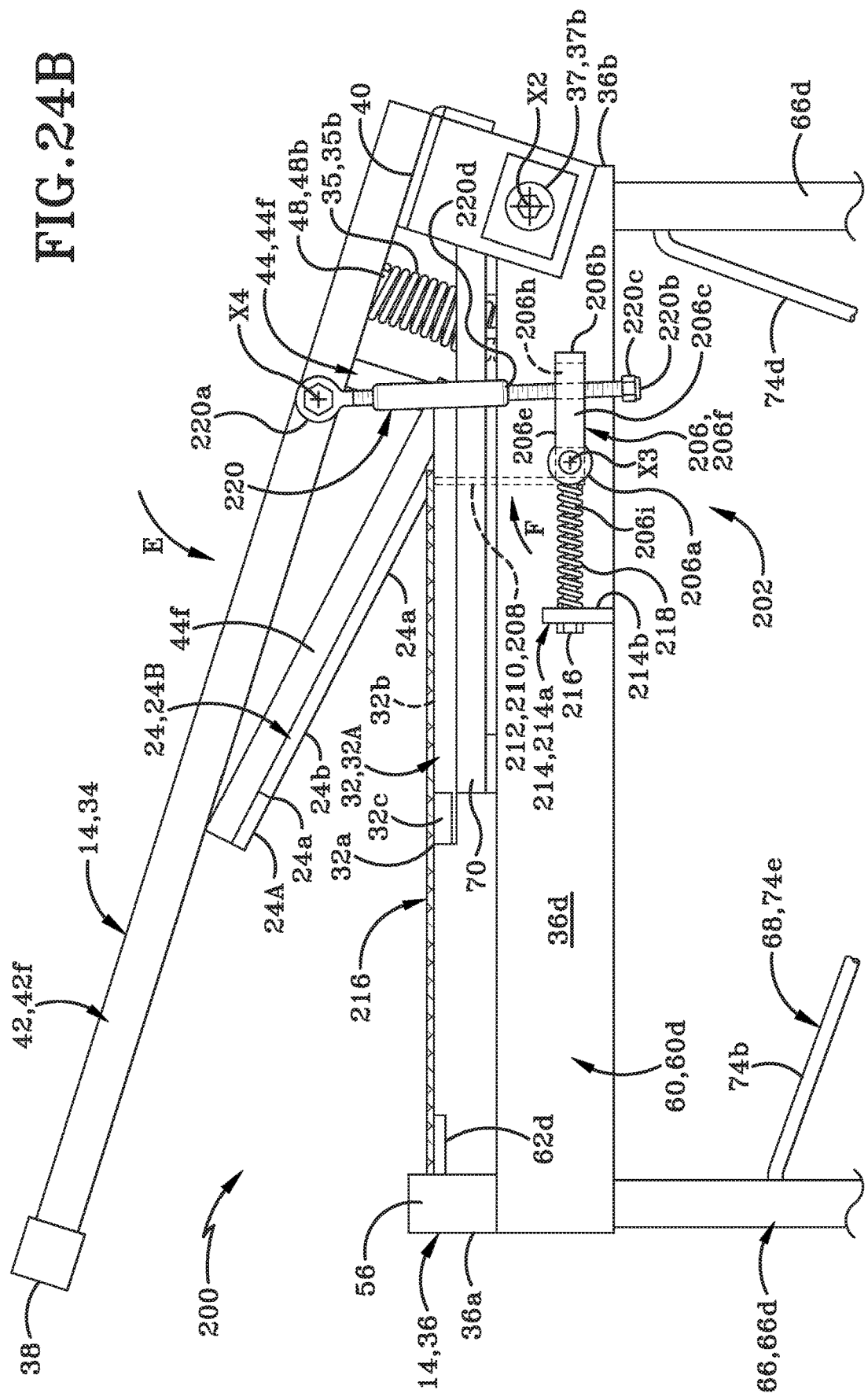
FIG. 24B is an operational view of FIG. 24A showing an upper frame of the shingle cutting machine of FIG. 22 being lowered to cut the perforated 3-Tab shingle.

With primary reference to FIG. 24A-FIG. 24D, the spring is biasable between a plurality of positions. When the shingle cutting machine 200 is in the shingle loading position, the spring 218 is biased in a first position (FIG. 24A). As the shingle cutting machine 200 is moved into the cutting position, the spring is biased into a second position (FIG. 24B). After the shingle cutting machine 200 cuts the shingles, the spring 218 is biased into a third position (FIG. 24C). As the shingle cutting machine 200 returns to the single loading position, the spring is biased back through the second position to the first position. More particularly, the upper frame assembly 34 is moved from the shingle loading position in a general direction indicated by arrow "E" (FIGS. 24B and 24C) to lower the first upper blade assembly 18, the second upper blade assembly 20, the third upper blade assembly 22 and the fourth upper blade assembly 24 to interact with the first lower blade assembly 26, the second lower blade assembly 28, the third lower blade assembly 30 and the fourth lower blade assembly 32 to cut the perforated three tab-shingle 216 into individual shingle tabs 217. More particularly, first cutting edge 18a interacts with first cutting edge 26a, second cutting edge 18b interacts with second cutting edge 26b, first cutting edge 20a interacts with first cutting edge 28a, second cutting edge 20b interacts with second cutting edge 28b, third cutting edge 20c interacts with third cutting edge 28c, first cutting edge 22a interacts with first cutting edge 30a, second cutting edge 22b interacts with second cutting edge 30b, third cutting edge 22c interacts with third cutting edge 30c, first cutting edge 24a interacts with first cutting edge 32a and second cutting edge 24b interacts with second cutting edge 32b.

Figure 24D:
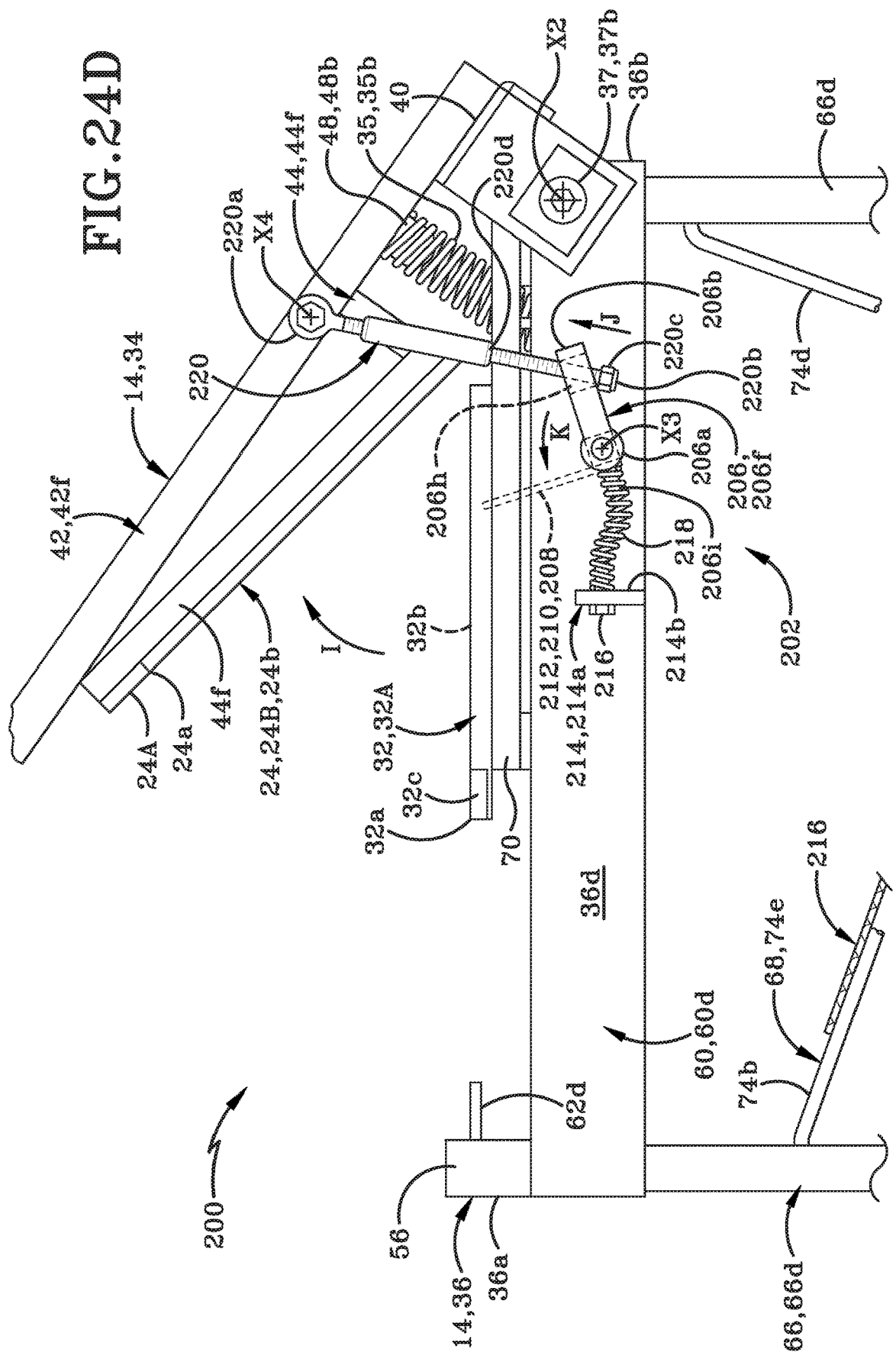
FIG. 24D is an operational view of FIG. 24A showing the upper frame of the shingle cutting machine of FIG. 22 being raised.

As the upper frame assembly 34 is being lowered, the push-pull rod 220 causes the lever mechanism 206 to rotate which, in turn, causes the first plate 208, the second plate 210, and the third plate 212 rotate in a general direction indicated by arrow "F" (FIG. 24B). The first plate 208, the second plate 210, and the third plate 212 rotate until the first plate 208, the second plate, 210, and the third plate 212 support the rear surface 216d of the perforated 3-Tab shingle 216. As the upper frame is lowered further, push-pull rod 220 rotates in a general direction indicated by arrow "G" (FIG. 24C), which, in turn, causes the first plate, 208, the second plate 210, and the third plate 212 to rotate in the general direction indicated by arrow "F" until the perforated 3-Tab shingle 216 is no longer supported by the first plate 208, the second plate 210, and the third plate 212. As the perforated 3-Tab shingle 216, which is now cut into three individual shingle tabs 217, is no longer supported by the first plate 208, the second plate 210, and the third plate 212, the individual shingle tabs 217 fall in a general direction indicated by arrow "H" (FIG. 24C) due to gravity into the retaining portion 74e of the retaining mechanism 68. After the perforated 3-Tab shingle 216 is cut, the upper frame assembly 34 is moved back toward the shingle loading position in a general direction indicated by arrow "I" (FIG. 24D), the push-pull rod 220 moves in a general direction indicated by arrow "J" (FIG. 24D), and the lever mechanism 206 moves in a general direction indicated by arrow "K" (FIG. 24D).

Still further, the first upper blade assembly 18, the second upper blade assembly 20, the third upper blade assembly 22 and the fourth upper blade assembly 24 are positioned to interact with the first lower blade assembly 26, the second lower blade assembly 28, the third lower blade assembly 30 and the fourth lower blade assembly 32 to create a notch 217a in the individual shingle tabs 217. The notch 217a is beneficial as it allows the individual shingle tabs 217 to easily overlap one another.

Although the operation of the shingle cutting machine 200 has been described as being suitable to cut perforated 3-Tab shingles into individual tabs of shingles, it is envisioned that the shingle cutting machine 200 may be configured to cut any suitable types of shingles into any suitable portions.

Figure 26:
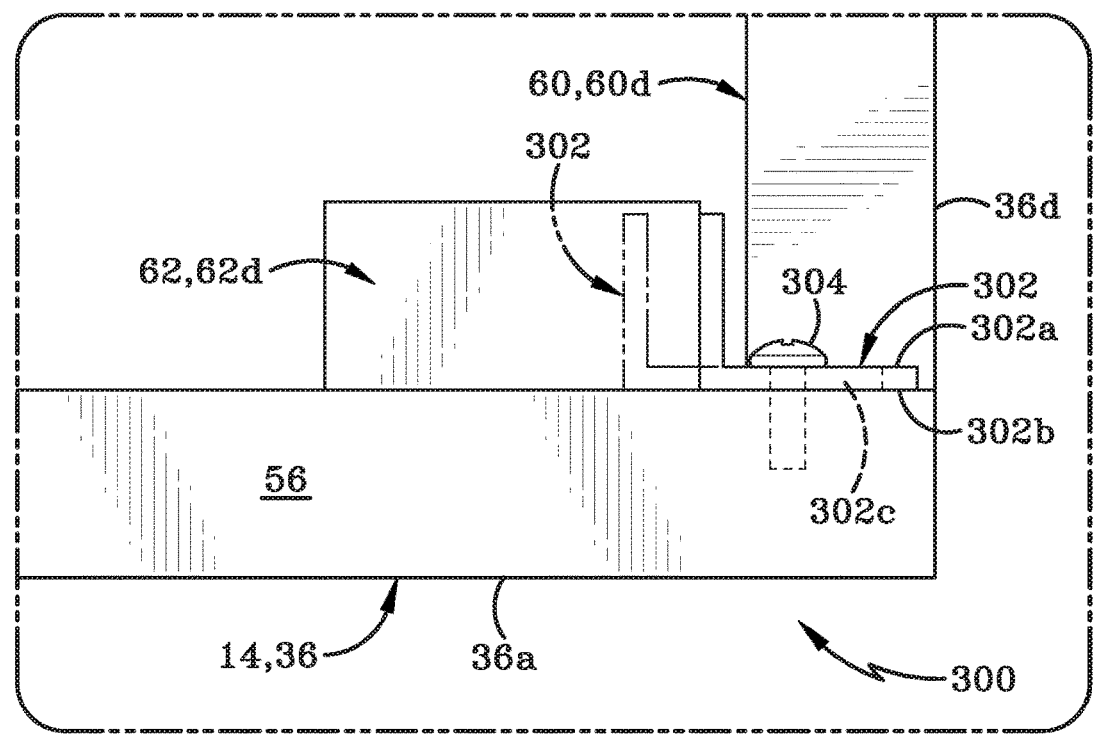
FIG. 26 is an enlarged fragmentary view of a third embodiment of a shingle cutting machine in accordance with the present disclosure showing a portion of the shingle cutting machine of FIG. 4 highlighted by the dashed box labeled SEE FIG. 26 with the addition of an adjustment mechanism.

Referring to FIG. 26, there is shown a partial view of a third embodiment of a shingle cutting machine in accordance with one aspect of the present disclosure, with the shingle cutting machine generally indicated at 300. Shingle cutting machine 300 is substantially identical to shingle cutting machine 10 of FIG. 4-FIG. 21 in structure and function with a few exceptions/additions that will be discussed hereafter in greater detail. Shingle cutting machine 300 further includes an adjustment mechanism 302 configured to accommodate different sizes of shingles as more fully described below. Adjustment mechanism 302 is an L-shaped member and includes a first surface 302a, a second surface 302b, and a slot 302c extending through the first surface 302a and the second surface 302b. Adjustment mechanism 302 is slidable along slot 302c and is held in place via a fastener 304, such as a bolt. The adjustment mechanism 302 may be provided on the placement mechanism 62a and 62d. In operation, the adjustment mechanism may be moved along slot to accommodate various sizes of shingles.

Figure 27:
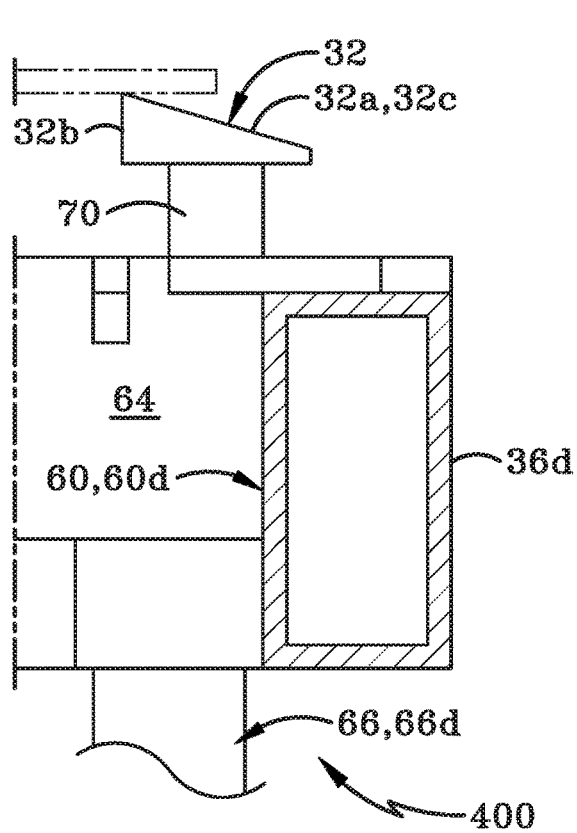
FIG. 27 is a cross-section view taken along line 27-27 of FIG. 6 of a fourth embodiment of a shingle cutting machine in accordance with the present disclosure.
Figure 27A:
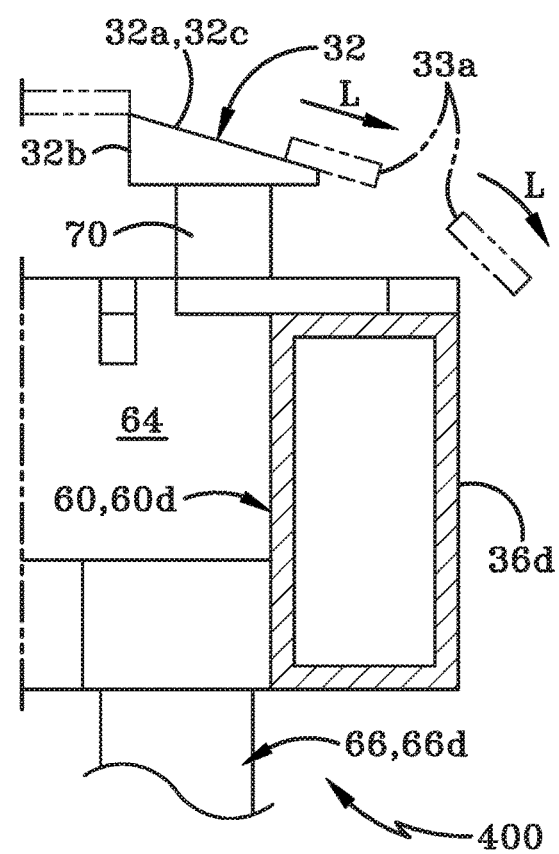
FIG. 27A is an operational view of FIG. 27 showing a portion of a shingle falling off of the shingle cutting machine.

Referring to FIG. 27, there is shown a partial view of a fourth embodiment of a shingle cutting machine in accordance with one aspect of the present disclosure, with the shingle cutting machine generally indicated at 400. Shingle cutting machine 300 is substantially identical to shingle cutting machine 10 of FIG. 4-FIG. 21 in structure and function with a few exceptions/additions that will be discussed hereafter in greater detail. Instead of the fourth lower blade assembly 32 being generally rectangular in shape and including a transversely extending first cutting edge 32a, a longitudinally extending second cutting edge 32b and a tapered portion 32c which is angled downwardly and toward the second side edge 36d of the lower frame assembly 36, the tapered portion 32c extends substantially along a length of the fourth lower blade assembly 32. Although not shown, the first lower blade assembly 26 may be configured in a substantially identical manner as the fourth lower blade assembly 32. In operation, and with reference to FIG. 27A, as the shingles 216 are cut, a scrap or a portion 33a of the shingle travels along the tapered portion 32c in a general direction indicated by arrow "L" (FIG. 27A).

Figure 28:
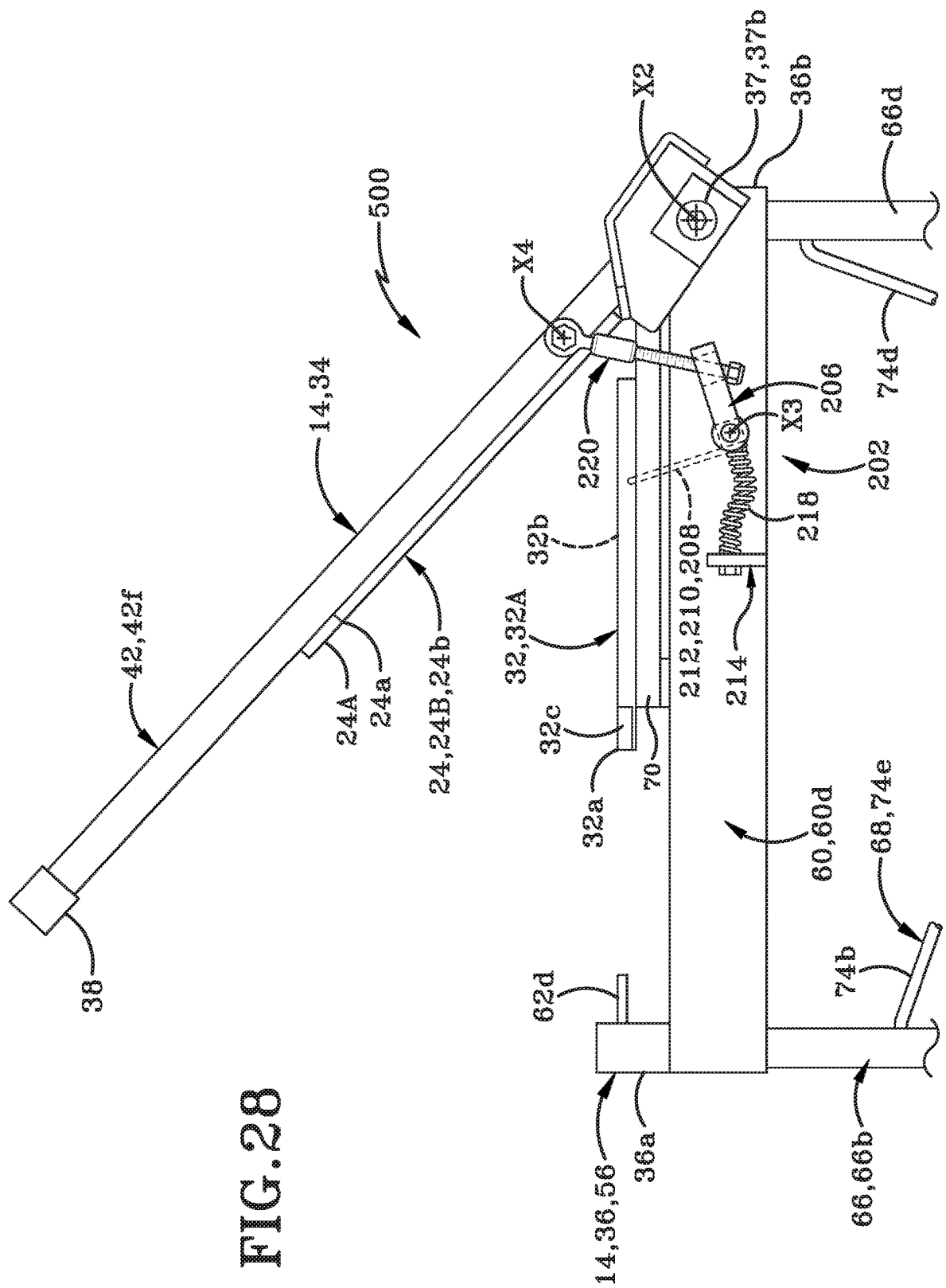
FIG. 28 is a right elevation view of a fifth embodiment of a shingle cutting machine in accordance with the present disclosure.

Referring to FIG. 28, there is shown a partial view of a fifth embodiment of a shingle cutting machine in accordance with one aspect of the present disclosure, with the shingle cutting machine generally indicated at 500. Shingle cutting machine 500 is substantially identical to shingle cutting machine 10 of FIG. 4-FIG. 21 in structure and function with a few exceptions/additions that will be discussed hereafter in greater detail. Instead of the fourth upper blade assembly 24 being removably secured to the mounting bracket 44d, the fourth upper blade assembly 24 is mounted to the upper frame assembly 34. Although not shown, the first upper blade assembly 18, the second upper blade assembly 20, and the third upper blade assembly 22 may also be mounted to the upper frame assembly 34 in a similar manner.

Figure 29:
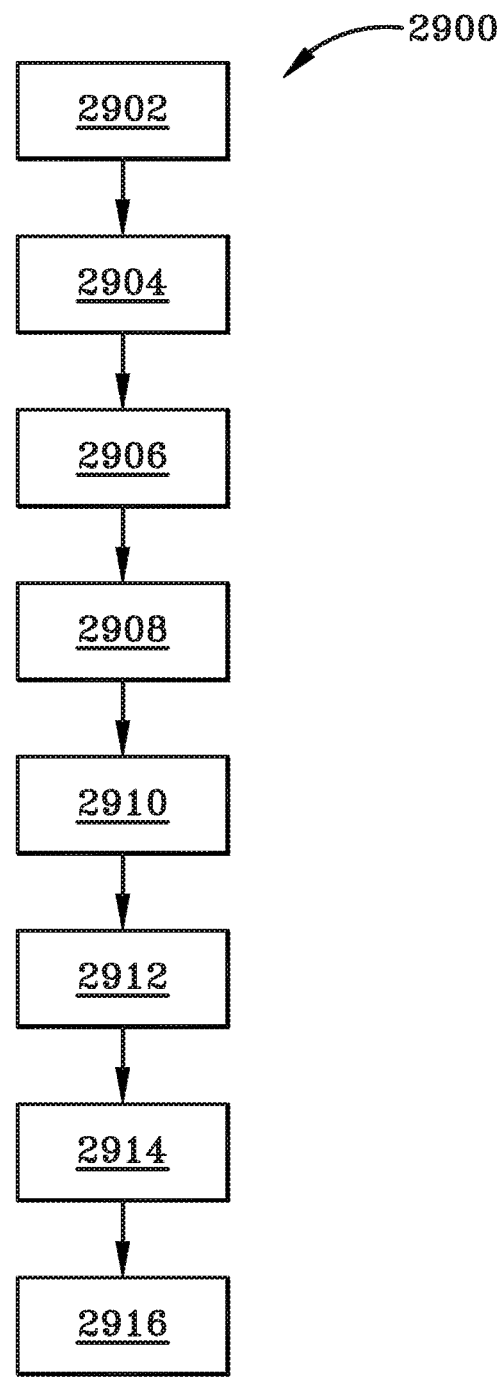
FIG. 29 is a flow chart of one method or process in accordance with the present disclosure.

FIG. 29 depicts an exemplary method or process in accordance with one aspect of the present disclosure and is generally referred to as 2900. The method 2900 includes pivoting an upper frame assembly of a shingle cutting machine into a loading position, which is shown generally at 2902. The method 2900 includes placing a shingle in a receiving area defined in a lower frame assembly of the shingle cutting machine, which is shown generally at 2904. The method 2900 includes pivoting the upper frame assembly from the loading position to a cutting position, which is shown generally at 2906. The method 2900 includes cutting the shingle, which is shown generally at 2908. The method 2900 includes dropping a shingle tab cut from the shingle into a collection area located vertically beneath the receiving area in the lower frame assembly, which is shown generally at 2910.

The method 2900 may further include maintaining the receiving area in a fixed orientation relative to the lower frame assembly during the cutting and dropping steps, which is shown generally at 2912. The method 2900 may further include shearing the shingle between an upper blade assembly provided on the upper frame assembly and a lower blade assembly provided on the lower frame assembly, which is shown generally at 2914. The method 2900 may further include passing a portion of the lower blade assembly through an opening in the upper blade assembly, which is shown generally at 2916.

Also, various inventive concepts is embodied as one or more methods, of which an example has been provided. The acts performed as part of the method is ordered in any suitable way. Accordingly, embodiments is constructed in which acts are performed in an order different than illustrated, which includes performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments is practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements is present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, is used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device is otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" is used herein to describe various features/elements, these features/elements should not be limited by these terms, unless the context indicates otherwise. These terms is used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers is read as if prefaced by the word "about" or "approximately," even if the term does not expressly appear. The phrase "about" or "approximately" is used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A machine, comprising:
a frame including an upper frame assembly and a lower frame assembly, wherein the upper frame assembly is pivotable relative to the lower frame assembly between a loading position and a cutting position;
a receiving area defined inwardly of the lower frame assembly, said receiving area being adapted to receive at least one shingle therein;
an upper blade assembly provided on the upper frame assembly;
a lower blade assembly provided on the lower frame assembly; wherein the lower blade assembly is positioned within the receiving area;
a blade member of the lower blade assembly; wherein the blade member of the lower blade assembly includes a plurality of linear cutting edges; wherein the upper and lower blade assemblies are operable in the receiving area;
a collection area located vertically below the receiving area; and
a retaining mechanism provided within the collection area; wherein the retaining mechanism includes a retaining portion and a plurality of mounting portions; wherein the retaining portion is positioned directly vertically below the receiving area; wherein at least a part of each linear cutting edge of the plurality of linear cutting edges of the blade member of the lower blade assembly is positioned directly vertically above the retaining portion of the retaining mechanism; wherein the retaining portion is configured to receive at least one shingle tab cut from the at least one shingle; and wherein the plurality of mounting portions fixedly secures the retaining mechanism to a plurality of legs of the lower frame assembly to prevent movement of the retaining mechanism; and wherein a side of the retaining mechanism is anchored to the plurality of legs at a higher elevation with respect to an opposing side of the retaining mechanism to form an inclined surface.

2. The machine of claim 1, wherein the lower frame assembly has a perimeter and no portion of the collection area extends outwardly beyond the perimeter.

3. The machine of claim 1, wherein the lower blade assembly remains in a fixed orientation relative to the lower frame assembly.

4. The machine of claim 1, wherein the upper blade assembly comprises:
a first blade body having a first cutting edge; and
a second blade body having a second cutting edge; wherein the second cutting edge is orthogonal to the first cutting edge.

5. The machine of claim 4, wherein the upper blade assembly further comprises:
a third blade body having a third cutting edge; wherein the third cutting edge is parallel to the first cutting edge.

6. The machine of claim 5, wherein the upper blade assembly further comprises:
an opening defined between the first cutting edge and the third cutting edge.

7. The machine of claim 6, wherein the lower blade assembly passes at least partially through the opening in the upper blade assembly when the upper frame assembly is pivoted into the cutting position.

8. The machine of claim 1, wherein at least two linear cutting edges of the plurality of linear cutting edges of the blade member of the lower blade assembly are orthogonally positioned with respect to one another.

9. The machine of claim 8, wherein the blade member further comprises:
a tapered portion; wherein at least one linear cutting edge of the plurality of linear cutting edges of the blade member of the lower blade assembly is provided on the tapered portion.

10. The machine of claim 9, wherein the lower frame assembly has a front edge and an opposed rear edge defining a transverse center axis therebetween; and wherein the tapered portion angles away from the transverse center axis in a downward direction.

11. The machine of claim 10, wherein the tapered portion is provided a distance rearwardly from the front edge of the lower frame assembly.

12. The machine of claim 1, wherein at least one linear cutting edge of the plurality of linear cutting edges of the blade member of the lower blade assembly is positioned at a downward angle relative to another linear cutting edge of the plurality of linear cutting edges of the blade member of the lower blade assembly.

13. The machine of claim 1, further comprising:
a vertically extending plate provided on the lower frame assembly; wherein the vertically extending plate is linearly aligned with the blade member of the lower blade assembly.

* * * * *